United States Patent
Kajihara et al.

(10) Patent No.: US 8,305,429 B2
(45) Date of Patent: Nov. 6, 2012

(54) IMAGE PICKUP APPARATUS AND IMAGE PICKUP METHOD

(75) Inventors: Junji Kajihara, Tokyo (JP); Kenji Yamamoto, Kanagawa (JP); Isao Ichimura, Tokyo (JP)

(73) Assignee: Sony Corporation, Tokyo (JP)

( * ) Notice: Subject to any disclaimer, the term of this patent is extended or adjusted under 35 U.S.C. 154(b) by 763 days.

(21) Appl. No.: 12/312,752

(22) PCT Filed: Nov. 28, 2007

(86) PCT No.: PCT/JP2007/072976
§ 371 (c)(1),
(2), (4) Date: May 26, 2009

(87) PCT Pub. No.: WO2008/069077
PCT Pub. Date: Jun. 12, 2008

(65) Prior Publication Data
US 2010/0066812 A1    Mar. 18, 2010

(30) Foreign Application Priority Data

Dec. 4, 2006  (JP) .................................. 2006-326750
Jul. 18, 2007  (JP) .................................. 2007-186468

(51) Int. Cl.
*H04N 5/225*  (2006.01)
*G02B 13/16*  (2006.01)

(52) U.S. Cl. .......... 348/46; 348/340; 348/374; 359/772; 359/690; 359/688; 359/791; 359/774

(58) Field of Classification Search ............. 348/46, 348/340, 374
See application file for complete search history.

(56) References Cited

U.S. PATENT DOCUMENTS

| | | | |
|---|---|---|---|
| 6,864,951 B1 | 3/2005 | Ren et al. | |
| 7,583,444 B1 * | 9/2009 | DeVoe et al. | 359/626 |
| 2002/0196558 A1 * | 12/2002 | Kroupenkine et al. | 359/665 |
| 2005/0105194 A1 * | 5/2005 | Matsui et al. | 359/772 |
| 2005/0225877 A1 | 10/2005 | Tang | |
| 2006/0192869 A1 | 8/2006 | Yoshino et al. | |

FOREIGN PATENT DOCUMENTS

JP  2005-167484  6/2005

OTHER PUBLICATIONS

Supplement European Search Report mailed Feb. 17, 2010 for corresponding European Application No. 07 83 2698.

(Continued)

*Primary Examiner* — Jude Jean Gilles
(74) *Attorney, Agent, or Firm* — Rader Fishman & Grauer, PLLC

(57) ABSTRACT

An image pickup apparatus having a simple configuration and being capable of performing switching between an image pickup mode based on a light field photography technique and a normal high-resolution image pickup mode is provided. The image pickup apparatus includes an image pickup lens 11, a microlens array section 12 where light passing through the image pickup lens 11 enters, and an image pickup device 13 sensing light emitted from the microlens array section 12, and the focal length of each of microlenses constituting the microlens array section 12 is variable in response to an applied voltage.

23 Claims, 12 Drawing Sheets

OTHER PUBLICATIONS

Ren H. et al. "Flat Polymeric Microlens Array" Optics Communications, North-Holland Publishing Co. Amsterdam, NL, vol. 261, No. 2, May 15, 2006, pp. 296-299, XP025252642, ISSN: 0030-4018.

Gorman, C.B. et al, "Control of the Shape of Liquid Lenses on a Modified Gold Surface Using an Applied Electrical Potential Across a Self-Assembled Monolayer" Langmuir, American Chemical Society, Washington, DC, US, vol. 11, No. 6, Jun. 1, 1995, pp. 2242-2246, XP001164176, ISSN: 0743-7463.

Wang, Xin et al. "Tunable Reflective Lens Array Based on Liquid Crystal on Silicon" Optic Express, OSA(Optical Society of America), Washington, DC, vol. 13, No. 2, Jan. 24, 2005, pp. 352-357, XP007911242, ISSN: 1094-4087.

Ren Ng, et al. "Light Field Photography with a Hand-held Plenoptic Camera," Stanford Tech Report CTSR Feb. 2005, pp. 1-11, 2005.

Internation Search Report, International Application No. PCT/JP2007/072976, International Search Report mailing date: Feb. 12, 2008.

* cited by examiner

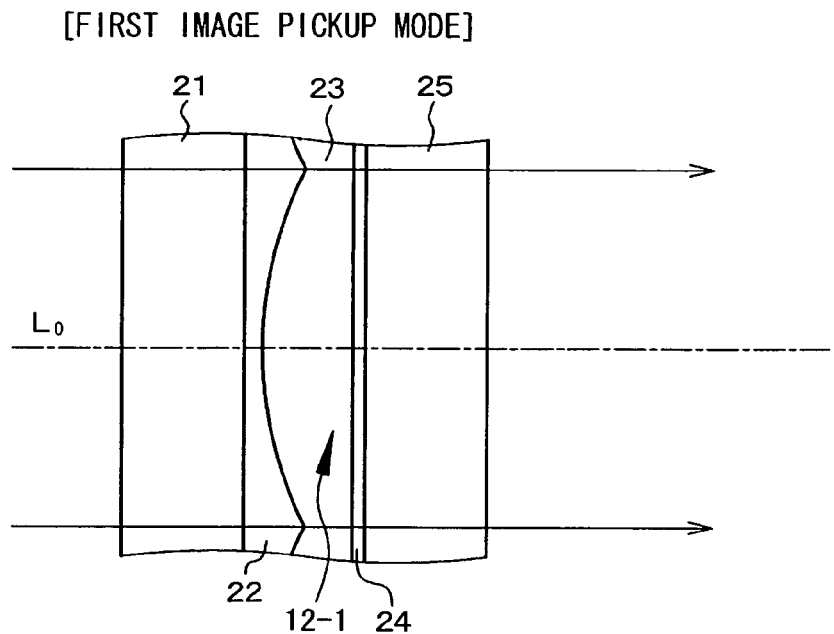
FIG. 3(A) [FIRST IMAGE PICKUP MODE]
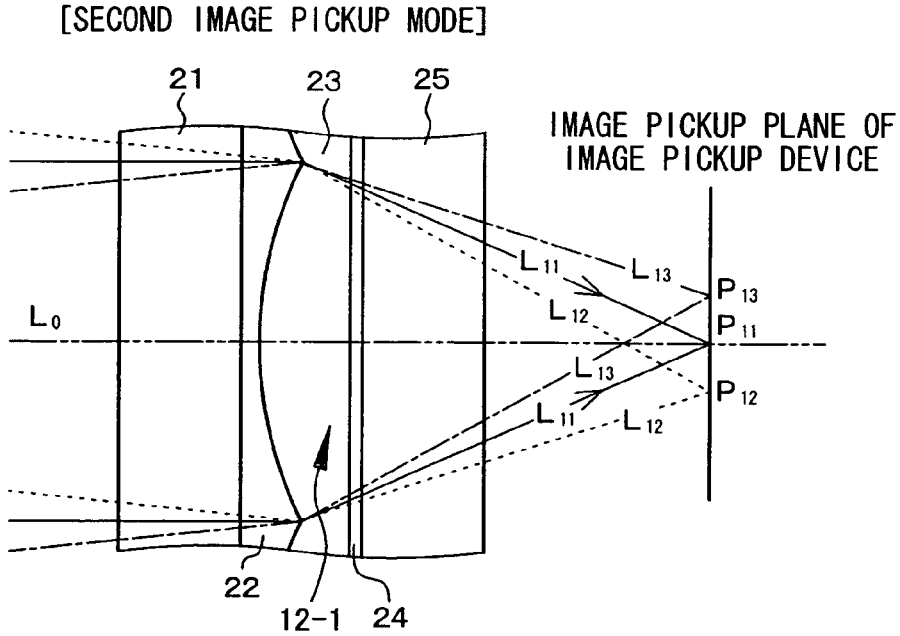
FIG. 3(B) [SECOND IMAGE PICKUP MODE]

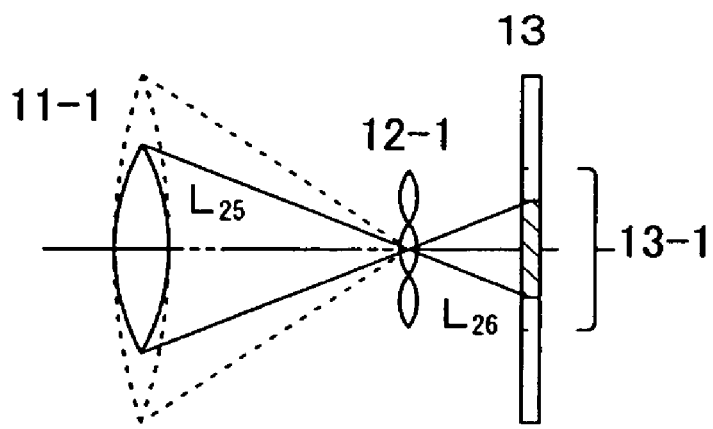
FIG. 8(A)
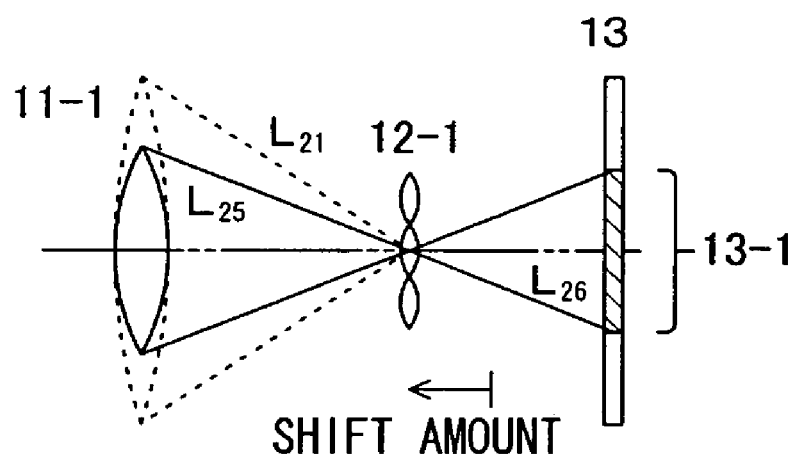
FIG. 8(B)
FIG. 8

IMAGE PICKUP APPARATUS AND IMAGE PICKUP METHOD

TECHNICAL FIELD

The present invention relates to an image pickup apparatus and an image pickup method, more specifically to an image pickup apparatus and an image pickup method capable of switching between two image pickup modes, for example, an image pickup mode based on a light field photography technique and a normal high-resolution image pickup mode.

BACKGROUND ART

Various image pickup apparatuses have been hitherto proposed and developed. Moreover, an image pickup apparatus performing predetermined image processing on an image pickup signal obtained by image pickup to output the image pickup signal has been proposed. For example, Patent Document 1 and Non-patent Document 1 propose an image pickup apparatus using a technique called light field photography. The image pickup apparatus includes an image pickup lens, a microlens array, a light-sensing device and an image processing section, and an image pickup signal obtained from the light-sensing device includes the intensity of light on a light-sensing plane of the light-sensing device as well as information on the traveling direction of the light. Then, the image processing section reconstructs an image viewed from an arbitrary viewpoint or an arbitrary direction on the basis of such an image pickup signal.

[Patent Document 1] International Patent Publication Ser. No. 06/039,486 pamphlet

[Non-patent Document 1] Ren.Ng, et al, "Light Field Photography with a Hand-Held Plenoptic Camera", Stanford Tech Report CTSR2005-02

DISCLOSURE OF THE INVENTION

Incidentally, an image pickup apparatus employing a light field photography technique is expected to use a normal high-resolution image pickup mode not employing the light field photography technique (which is referred to as first image pickup mode) and an image pickup mode based on the light field photography (which is referred to as second image pickup mode) by appropriately switching between them. However, to switch between two image pickup modes in such a manner, it is necessary to mechanically shift a microlens array. More specifically, in the first image pickup mode, as the microlens array is not necessary, it is necessary to shift and remove the microlens array from above an optical axis. On the other hand, in the second image pickup mode, it is necessary to arrange the microlens array on the optical axis. Therefore, in the case of attempting to use two image pickup modes by switching between them, there is an issue that the configuration and composition of the image pickup apparatus are complicated to cause an increase in the size of the whole image pickup apparatus.

Therefore, it is an object of the invention to provide an image pickup apparatus having simple configuration and composition and being capable of easily switching between two image pickup modes, for example, an image pickup mode based on the light field photography technique and a normal high-resolution image pickup mode, and an image pickup method using the image pickup apparatus.

An image pickup apparatus according to a first mode of the invention for achieving the above-described object is characterized by including:

(A) an image pickup lens;
(B) a microlens array section where light passing through the image pickup lens enters; and
(C) an image pickup device sensing light emitted from the microlens array section,
in which the focal length of each of microlenses constituting the microlens array section is variable in response to an applied voltage.

The image pickup apparatus according to the first mode of the invention can have a configuration in which image pickup is performed in a first image pickup mode and a second image pickup mode, at the time of image pickup in the first image pickup mode, the focal length of each of the microlenses constituting the microlens array section becomes infinite, thereby an image by the image pickup lens is formed on the image pickup device, and at the time of image pickup in the second image pickup mode, an image by the image pickup lens is formed on the microlenses, and the focal length of each of the microlenses becomes a finite value, thereby the image by the image pickup lens formed on the microlenses is projected on the image pickup device.

Moreover, an image pickup method according to a first mode of the invention for achieving the above-described object using the image pickup apparatus according to the first mode of the invention, that is, an image pickup apparatus including:

(A) an image pickup lens;
(B) a microlens array section where light passing through the image pickup lens enters; and
(C) an image pickup device sensing light emitted from the microlens array section,
the image pickup apparatus in which the focal length of each of microlenses constituting the microlens array section is variable in response to an applied voltage, the image pickup method characterized in that image pickup is performed in a first image pickup mode and a second image pickup mode, at the time of image pickup in the first image pickup mode, the focal length of each of the microlenses constituting the microlens array section becomes infinite, thereby an image by the image pickup lens is formed on the image pickup device, and at the time of image pickup in the second image pickup mode, an image by the image pickup lens is formed on the microlenses, and the focal length of each of the microlenses becomes a finite value, thereby the image by the image pickup lens formed on the microlenses is projected on the image pickup device.

The image pickup apparatus according to the first mode of the invention including the above-described preferable configuration or the image pickup apparatus used in the image pickup method (hereinafter collectively referred to as "the image pickup apparatus or the like according to the first mode of the invention) further includes:

(D) an image processing section for performing predetermined image processing on a signal from the image pickup device; and (E) a voltage supply section for applying a voltage to the microlens array section, and the image pickup apparatus can have a configuration in which image pickup is performed in the first image pickup mode and the second image pickup mode, at the time of image pickup in the first image pickup mode, the application of a voltage from the voltage supply section to the microlens array section is suspended, and the predetermined image processing by the image processing section is suspended, and at the time of image pickup in the second image pickup mode, a voltage is applied from the voltage supply section to the microlens array section, and the predetermined image processing by the image processing section is performed. In addition, for the sake of convenience, such a configuration is called first configuration.

Alternatively, in the image pickup apparatus or the like according to the first mode of the invention further includes:

(D) an image processing section for performing predetermined image processing on a signal from the image pickup device; and (E) a voltage supply section for applying a voltage to the microlens array section, and the image pickup apparatus can have a configuration in which image pickup is performed in the first image pickup mode and the second image pickup mode, at the time of image pickup in the first image pickup mode, a voltage is applied from the voltage supply section to the microlens array section, and the predetermined image processing by the image processing section is suspended, and at the time of image pickup in the second image pickup mode, the application of a voltage from the voltage supply section to the microlens array section is suspended, and the predetermined image processing by the image processing section is performed. In addition, for the sake of convenience, such a configuration is called second configuration.

The image pickup apparatus or the like according to the first mode of the invention having any of the above-described various preferable configurations can have a configuration in which a driving means for changing a distance between the microlens array section and the image pickup device while maintaining a fixed distance is further included between the image pickup lens and the microlens array section. For the sake of convenience, such a configuration is called third configuration. Then, in the third configuration, the driving means can have a configuration in which the driving means shifts the image pickup device along an optical axis of the image pickup apparatus, or a configuration in which the driving means shifts the image pickup lens and the microlens array section along the optical axis of the image pickup apparatus, or in the third configuration, the image pickup apparatus can have a configuration in which (D) an image processing section for performing predetermined image processing on a signal from the image pickup device; and (E) a voltage supply section for applying a voltage to the microlens array section are further included, and in the case where a mismatch between the F-number of the image pickup lens and the F-number of each of the microlenses constituting the microlens array section occurs, a voltage applied from the voltage supply section to the microlens array section is changed, and a distance between the microlens array section and the image pickup device is changed by the driving means.

Moreover, the image pickup apparatus or the like according to the first mode of the invention having any of the above-described preferable various configurations can have a configuration in which the microlens array section is configured of a liquid crystal lens array. For the sake of convenience, such a configuration is called fourth configuration. Then, in the fourth configuration, the liquid crystal lens array can have a configuration in which the liquid crystal lens array includes:

(a) a first substrate including a first electrode, (b) a second substrate including a second electrode, and (c) a liquid crystal layer arranged between the first electrode and the second electrode, and depending on whether or not a voltage is applied to the first electrode and the second electrode, the liquid crystal lens array functions as a lens. At least one of the first electrode and the second electrode preferably but not exclusively has a curved surface for forming a microlens.

Alternatively, in the fourth configuration, the image pickup apparatus or the like can have a configuration in which when a three-dimensional Gaussian space with an optical axis of the image pickup apparatus as a Z axis is defined, and the liquid crystal lens array functions as a lens, each of the microlenses has substantially equal power (optical power) in an X-axis direction and a Y-axis direction. For the sake of convenience, such a configuration is called 4Ath configuration. Here, having substantially equal power in the X-axis direction and the Y-axis direction means satisfying $P_Y=P_X$ where in the case where when an arbitrary axis orthogonal to the Z axis is defined, and a virtual plane including the axis and the Z axis is defined, an axis included in a virtual plane capable of obtaining maximum power is X axis and power in the X-axis direction is $P_X$, and power in the Y-axis direction is $P_Y$. Alternatively, the image pickup apparatus or the like can have a configuration in which when a three-dimensional Gaussian space with an optical axis of the image pickup apparatus as a Z axis is defined, a polarizing plate emitting light polarized in the X-axis direction and a polarization direction variable device are arranged between the image pickup lens and the microlens array section, and when the liquid crystal lens array functions as a lens, each of the microlenses does not have power (optical power) in the X-axis direction and has power (optical power) in the Y-axis direction. For the sake of convenience, such a configuration is called 4Bth configuration. In the 4Bth configuration, the liquid crystal lens array constitutes a microlens array section having an anisotropic focal length on the Z axis as a center. In other words, each of liquid crystal lenses constituting the liquid crystal lens array forms a microlens having a finite focal length in a YZ plane, and an infinite focal length in an XZ plane. Alternatively, the image pickup apparatus or the like can have a configuration in which when a three-dimensional Gaussian space with an optical axis of the image pickup apparatus as a Z axis is defined, a polarizing plate emitting light polarized in the X-axis direction and a polarization direction variable device are arranged between the image pickup lens and the microlens array section, and when the liquid crystal lens array functions as a lens, each of the microlenses does not have power (optical power) in the Y-axis direction and has power (optical power) in the X-axis direction. For the sake of convenience, such a configuration is called 4Cth configuration. In the 4Cth configuration, the liquid crystal lens array constitutes a microlens array section having an anisotropic focal length on Z axis as a center. In other words, each of liquid crystal lenses constituting the liquid crystal lens array forms a microlens having a finite focal length in the XY plane and an infinite focal length in the YZ plane. The power (optical power) means the refractive power of a lens, and is typically represented by the inverse of the focal length of the lens. Moreover, having power in the X-axis direction means exerting a lens effect on light polarized in the X-axis direction, and having power in the Y-axis direction means exerting a lens effect on light polarized in the Y-axis direction, not having power in the X-axis direction means not exerting a lens effect on light polarized in the X-axis direction, and not having power in the Y-axis direction means not exerting a lens effect on light polarized in the Y-axis direction.

An image pickup apparatus according to a second mode of the present invention for achieving the above-described object is characterized by including:

(A) an image pickup lens;

(B) a microlens array section where light passing through the image pickup lens enters; and (C) an image pickup device sensing light emitted from the microlens array section, in which when a three-dimensional Gaussian space with an optical axis of the image pickup apparatus as a Z axis is defined, a polarizing plate emitting light polarized in an X-axis direction and a polarization direction variable device are further arranged between the image pickup lens and the microlens array section, the microlens array section is configured of a liquid crystal lens array, and each of microlenses constituting the microlens array section does not have power in the X-axis direction and has power in a Y-axis direction, or each of the microlenses does not have power in the Y-axis direction and has power in the X-axis direction.

The image pickup apparatus according to the second mode of the invention can have a configuration in which image pickup is performed in a first image pickup mode and a second image pickup mode, at the time of image pickup in the first image pickup mode, by the activation of the polarization direction variable device, light polarized in a direction where each of microlenses constituting a microlens array section does not have power passes through the microlenses, and an image by the image pickup lens is formed on the image pickup device, and at the time of image pickup in the second image pickup mode, by the activation of the polarization direction variable device, light polarized in a direction where each of the microlenses constituting the microlens array section has power enters into the microlenses, and an image by the image pickup lens is formed on the microlenses, and the image by the image pickup lens formed on the microlenses is projected on the image pickup device.

An image pickup method according to a second mode of the present invention for achieving the above-described object including the image pickup apparatus according to the second mode of the invention, that is, an image pickup apparatus including:

(A) an image pickup lens;

(B) a microlens array section where light passing through the image pickup lens enters; and (C) an image pickup device sensing light emitted from the microlens array section, the image pickup apparatus in which when a three-dimensional Gaussian space with an optical axis of the image pickup apparatus as a Z axis is defined, a polarizing plate emitting light polarized in an X-axis direction and a polarization direction variable device are further arranged between the image pickup lens and the microlens array section, the microlens array section is configured of a liquid crystal lens array, and each of microlenses constituting the microlens array section does not have power in the X-axis direction and has power in a Y-axis direction, or each of the microlenses does not have power in the Y-axis direction and has power in the X-axis direction, the image pickup method characterized in that image pickup is performed in a first image pickup mode and a second image pickup mode, at the time of image pickup in the first image pickup mode, by the activation of the polarization direction variable device, light polarized in a direction where each of the microlenses constituting the microlens array section does not have power passes through the microlenses, and an image by the image pickup lens is formed on the image pickup device, and at the time of image pickup in the second image pickup mode, by the activation of the polarization direction variable device, light polarized in a direction where each of the microlenses constituting the microlens array section has power enters into the microlenses, and an image by the image pickup lens is formed on the microlenses, and the image by the image pickup lens formed on the microlenses is projected on the image pickup device.

The image pickup apparatus according to the second mode of the invention including the above-described preferable configuration or the image pickup apparatus used in the image pickup method (hereinafter collectively referred to as "the image pickup apparatus or the like according to the second mode of the invention") further includes:

(D) an image processing section for performing predetermined image processing on a signal from the image pickup device, and the image pickup apparatus can have a configuration in which image pickup is performed in the first image pickup mode and the second image pickup mode, at the time of image pickup in the first image pickup mode, the predetermined image processing by the image processing section is suspended, and at the time of image pickup in the second image pickup mode, the predetermined image processing by the image processing section is performed.

The image pickup apparatus or the like according to the second mode of the invention having any of the above-described preferable various configurations can have a configuration in which a driving means for changing a distance between the microlens array section and the image pickup device while maintaining a fixed distance is further included between the image pickup lens and the microlens array section. Then, in this configuration, the driving means can have a configuration in which the driving means shifts the image pickup device along an optical axis of the image pickup apparatus or a configuration in which the driving means shifts the image pickup lens and the microlens array section along the optical axis of the image pickup apparatus, or in the configuration the image pickup apparatus or the like can have a configuration in which (D) an image processing section for performing predetermined image processing on a signal from the image pickup device is further included, and in the case where a mismatch between the F-number of the image pickup lens and the F-number of each of the microlenses constituting the microlens array section occurs, the power of each of the microlenses constituting the microlens array section is changed, and a distance between the microlens array section and the image pickup device is changed by the driving means.

The image pickup apparatus or the like according to the second mode of the invention having any of the above-described preferable various configurations can have a configuration in which the polarization direction variable device is configured of a liquid crystal device. More specifically, the image pickup apparatus or the like can have a configuration in which the liquid crystal device constituting the polarization direction variable device includes:

(a') a pair of substrates, (b') electrodes arranged on the pair of substrates, respectively, and (c') a liquid crystal layer arranged between the electrodes arranged on the pair of substrates, respectively. In this case, the alignment direction of liquid crystal molecules in proximity to the pair of substrates is parallel to the X-axis direction, and the alignment direction of liquid crystal molecules in proximity to the other substrate is parallel to the Y-axis direction. Moreover, each of the pair of electrodes can be configured of one electrode. In this case, a liquid crystal material of which the liquid crystal layer is made in the polarization direction variable device, a liquid crystal material having a typical twisted nematic effect (TN effect) can be used. Further, the polarizing plate (including a polarizing film or a polarizing sheet) may be a polarizing plate having a known configuration and composition.

In the image pickup apparatus according to the second mode of the invention having any of the above-described preferable various configurations, the liquid crystal lens array includes:

(a) a first substrate including a first electrode, (b) a second substrate including a second electrode, and (c) a liquid crystal layer arranged between the first electrode and the second electrode, and the image pickup apparatus or the like can, but not exclusively, have a configuration in which depending on whether or not a voltage is applied to the first electrode and the second electrode, the liquid crystal lens array functions as a lens. At least one electrode of the first electrode and the second electrode preferably but not exclusively has a curved surface for forming a microlens.

In the image pickup apparatus or the like according to the second mode of the invention, the polarizing plate and the polarization direction variable device are arranged between the image pickup lens and the microlens array section, and the polarizing plate and the polarization direction variable device may be arranged in this order from the image pickup lens side or the polarization direction variable device and the polarizing plate may be arranged in this order from the image pickup lens side.

As the image pickup lens in the image pickup apparatus or the like according to the first mode or the second mode of the invention (hereinafter simply and collectively referred to as the image pickup apparatus or the like of the invention), a typical image pickup lens used in a video camera, still camera or the like can be used. Moreover, as the image pickup device (an image pickup means), a plurality of CCDs (Charge Coupled devices) or CMOS sensors (for the sake of convenience, hereinafter referred to image pickup sensors constituting the image pickup device) arranged in a two-dimensional matrix form can be used. The microlens array section is configured of a plurality of microlenses arranged in a two-dimensional matrix form, and assuming that the number of microlenses is P×Q, and the number of the plurality of CCDs or CMOS sensors is M×N, for example, P=12M and Q=12N can, but not exclusively, be exemplified. More specifically, the finite focal length of the microlens may be a value at which an image pickup plane of the image pickup device is positioned on a focal plane of the microlens. It is desirable to have a configuration in which light emitted from one microlens does not enter into an image pickup censor corresponding to a microlens adjacent to the microlens.

In the image pickup apparatus or the like of the invention, as the driving means, for example, a device converting an electrical signal into mechanical operation, more specifically, a piezo device, a piezoelectric actuator or a bimetal can be used.

In the image pickup apparatus or the like of the invention, in the case where the microlens array section is configured of the liquid crystal lens array, as a liquid crystal material, a nematic liquid crystal, a cholesteric liquid crystal, or a chiral nematic liquid crystal can be exemplified.

In the image pickup apparatus or the like of the invention, the microlens can be an aspherical lens, but the microlens is not limited thereto, and can be any other lens, for example, a zone plate, a holographic lens, a kinoform lens, or a diffractive lens exemplified by a binary optical device.

According to the image pickup apparatus or the image pickup method according to the first mode of the invention, the microlens array section of which the focal length is variable in response to an applied voltage is included, so image pickup mode switching between the first image pickup mode in which incident light into the microlens array section forms an image without changing its direction on the image pickup device, and the second image pickup mode in which incident light forms an image on the microlenses, and then the image is projected on the image pickup device can be easily performed. Moreover, a common image pickup optical system is used in these two image pickup modes, so the configuration and composition of the image pickup apparatus are not complicated.

Moreover, according to the image pickup apparatus or the image pickup method according to the second mode of the invention, the polarizing plate and the polarization direction variable device are arranged between the image pickup lens and the microlens array section, so image pickup switching between the first image pickup mode in which incident light into the microlens array section forms an image without changing its direction on the image pickup device, and the second image pickup mode in which incident light forms an image on the microlenses, and then the image is projected on the image pickup device can be easily performed by the activation of the polarization direction variable device. Moreover, a common image pickup optical system is used in these two image pickup modes, so the configuration and composition of the image pickup apparatus are not complicated.

When the microlens array section is configured of the liquid crystal lens array, depending on the used liquid crystal material, the refractive index of the liquid crystal lens may be largely dependent on the polarization direction of incident light. In the application of image pickup using natural light which is non-polarized light (randomly polarized light), as a liquid crystal material for achieving desired refractive power, such a liquid crystal material is used, in the liquid crystal lens array, chromatic dispersion occurs, and as a result, large axial chromatic aberration or magnification chromatic aberration may occur. Therefore, to prevent the occurrence of such a phenomenon, for example, as a light source, natural light is not used and monochromatic light is used, and the 4Bth configuration or the 4Cth configuration in the image pickup apparatus or the like according to the first mode of the invention or the image pickup apparatus or the like according to the second mode of the invention may be used. However, the light source in these image pickup apparatuses and the like is not limited to monochromatic light, and natural light can be used depending on the used liquid crystal material.

BRIEF DESCRIPTION OF THE DRAWINGS

FIGS. 3(A) and (B) are enlarged schematic partially sectional views of a microlens array section for describing a lens effect of the microlens array section.

FIG. 8 is a schematic view of the image pickup lens for describing a modification example of the image pickup optical system optimization processing when changing the aperture of the image pickup lens.

BEST MODES FOR CARRYING OUT THE INVENTION

The present invention will be described below on the basis of embodiments referring to the accompanying drawings.
[First Embodiment]

Figure 1:
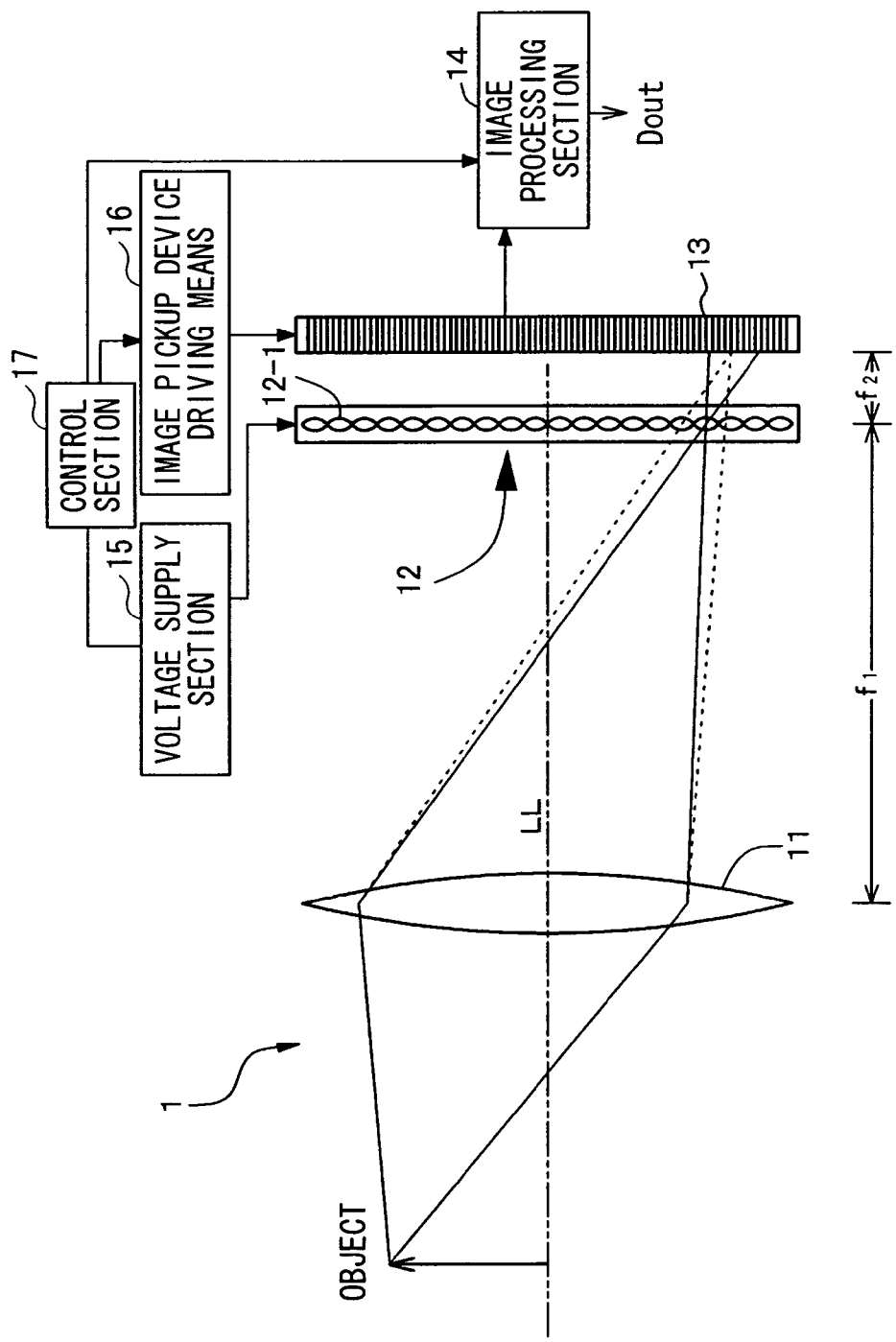
FIG. 1 is a conceptual diagram of an image pickup apparatus of a first embodiment.

A first embodiment relates to an image pickup apparatus and an image pickup method according to a first mode of the invention. More specifically, an image pickup apparatus of the first embodiment has a first configuration and a 4Ath configuration. FIG. 1 illustrates a conceptual diagram of an image pickup apparatus 1 of the first embodiment.

The image pickup apparatus 1 of the first embodiment picks up an image of an object subjected to image pickup to output image pickup data $D_{out}$, and includes:

(A) an image pickup lens 11, (B) a microlens array section 12 where light passing through the image pickup lens 11 enters, and (C) an image pickup device (an image pickup means) 13 sensing light emitted from the microlens array section 12.

The focal length of each of microlenses 12-1 constituting the microlens array section 12 is variable in response to an applied voltage.

Herein, in the image pickup apparatus 1 of the first embodiment, image pickup is performed in a first image pickup mode and a second image pickup mode, at the time of image pickup in the first image pickup mode, the focal length of each of microlenses 12-1 constituting the microlens array section 12 becomes infinite, thereby an image by the image pickup lens 11 is formed on the image pickup device 13 (as illustrated with a light ray indicated by dotted lines in FIG. 1), and at the time of image pickup in the second image pickup mode, an image by the image pickup lens 11 is formed on the microlenses 12-1, and the focal length of each of the microlenses 12-1 becomes a finite value, thereby the image by the image pickup lens 11 formed on the microlenses 12-1 is projected on the image pickup device 13 (as illustrated by a light ray indicated by solid lines in FIG. 1).

Moreover, the image pickup apparatus 1 of the first embodiment further includes:

(D) an image processing section 14 for performing predetermined image processing on a signal from the image pickup device 13, and (E) a voltage supply section (corresponding to an image pickup mode switching section) 15 for applying a voltage to the microlens array section 12, and the image pickup apparatus 1 further includes:

(F) a control section 17 controlling the image processing section 14 and the voltage supply section 15.

Then, in the image pickup apparatus 1, image pickup is performed in the first image pickup mode and the second image pickup mode, and at the time of image pickup in the first image pickup mode, the application of a voltage from the voltage supply section 15 to the microlens array section 12 is suspended and predetermined image processing by the image processing section 14 is suspended, and at the time of image pickup in the second image pickup mode, a voltage is applied from the voltage supply section 15 to the microlens array section 12, and the predetermined image processing by the image processing section 14 is performed.

In the first embodiment, or second to fourth embodiments which will be described later, the image pickup lens 11 is a main lens for picking up an image of an object subjected to image pickup, and is configured of, for example, a typical image pickup lens used in a video camera, a still camera or the like. Moreover, the microlens array section 12 is configured of a plurality (a number P×Q=325×230 in the first embodiment) of microlenses 12-1 arranged in a two-dimensional matrix form, and depending on the focused focal point state of the image pickup lens 11, the microlens array section 12 is arranged on the focal plane of the image pickup lens 11. Incidentally, a reference numeral $f_1$ in the drawing represents a distance from the center of the image pickup lens 11 to an image forming plane of the microlens array section 12. In this case, the microlens array section 12 is configured of a liquid crystal lens array. The image pickup device 13 is configured of a plurality of CCDs (a number M×N=4032×2688 of pixels in the first embodiment) arranged in a two-dimensional matrix form. The image pickup device 13 senses light emitted from the microlens array section 12, and produces an image pickup signal. The image pickup device 13 is arranged on the focal plane of the microlens array section 12. Incidentally, a reference numeral $f_2$ in the drawing represents a distance (the focal length of each of the microlenses 12-1) from the center of the microlens array section 12 to an image forming plane of the image pickup device 13, and is, for example, $f_2$=0.432 mm. An image pickup device driving means 16 drives the image pickup device 13, and controls the light-sensing operation of the image pickup device 13. The control section 17 controls the operations of the image processing section 14, the voltage supply section 15 and the image pickup device driving means 16. More specifically, the control section 17 appropriately controls the driving operation of the image pickup device driving means 16, and controls the operations of the image processing section 14 and the voltage supply section 15 on the basis of two image pickup modes, that is, the first image pickup mode and the second image pickup mode. The control section 17 is configured of a microcomputer.

In the first embodiment, or the second to fourth embodiments which will be described later, a voltage is applied to the microlens array section 12 by the voltage supply section 15. Then, in the first embodiment, or the second and third embodiments which will be described later, switching between two image pickup modes, that is, the first image pickup mode which is a normal high-resolution image pickup mode and the second image pickup mode which is an image pickup mode based on a light field photography technique is performed in response to the application state of a voltage to the microlens array section 12.

In the first embodiment, or the second to fourth embodiments which will be described later, in the second image pickup mode, the predetermined image processing is performed in the image processing section 14. In the second image pickup mode, the image processing section 14 performs the predetermined image processing on a signal (an image pickup signal) obtained by the image pickup device 13 to output the signal as image pickup data $D_{out}$. More specifically, refocusing arithmetic processing based on the light field photography technique is performed. Then, an image viewed from an arbitrary viewpoint or an arbitrary direction may be reconstructed by the refocusing arithmetic processing, and three-dimensional information of an image may be obtained. In addition, the refocusing arithmetic processing will be described later.

Figure 2A:
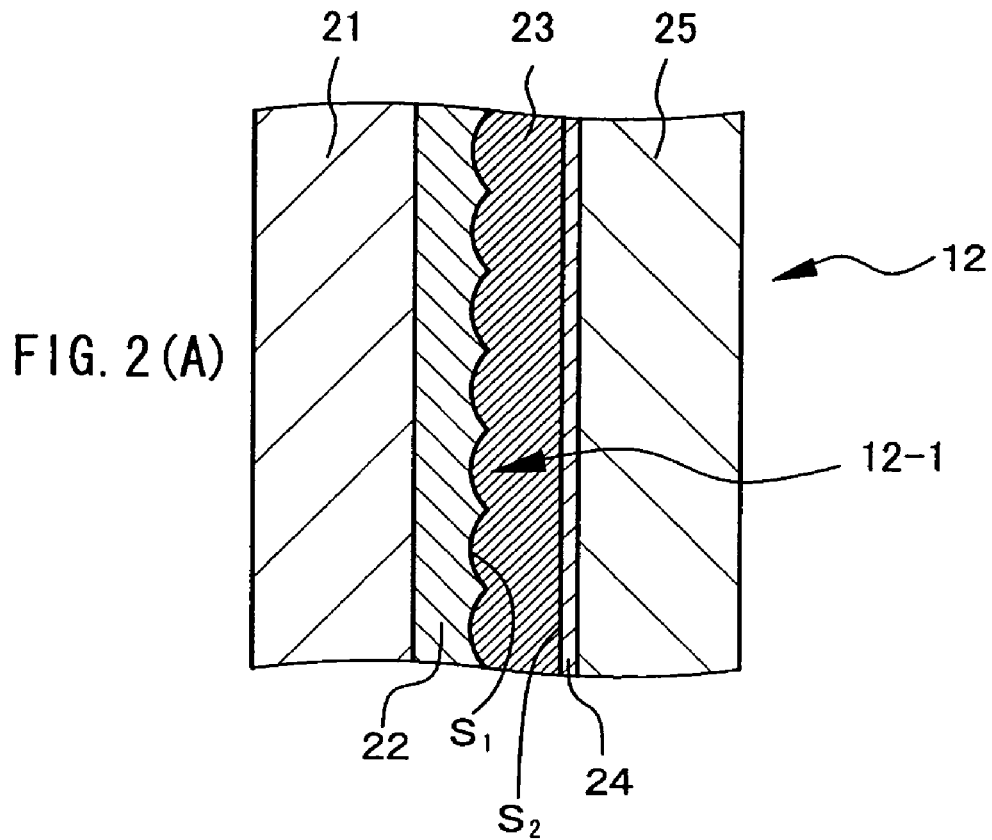
FIG. 2(A) is an enlarged schematic partially sectional view of a microlens array section forming the image pickup apparatus of the first embodiment.

FIG. 2(A) illustrates a schematic partially sectional view of the microlens array section 12 in the first embodiment or the second embodiment which will be described later. The microlens array section 12 is configured of a liquid crystal lens array, and the liquid crystal lens array includes:

(a) a first substrate 21 including a first electrode 22, (b) a second substrate 25 including a second electrode 24, and (c) a liquid crystal layer 23 arranged between the first electrode and the second electrode.

Then, the liquid crystal lens array functions as a lens depending on whether or not a voltage is applied to the first electrode 22 and the second electrode 24. In this case, at least one (the first electrode 22 in the first embodiment) of the first electrode 21 and the second electrode 24 has a curved surface for forming the microlens 12-1. In addition, a voltage is applied from the voltage supply section 15 to the first electrode 22 and the second electrode 24. Moreover, the first electrode 22 and the second electrode 24 are common electrodes, and each of them is configured of one electrode. In the first embodiment, when a three-dimensional Gaussian space with the optical axis of the image pickup apparatus 1 as a Z axis is defined, and the liquid crystal lens array functions as a lens, each microlens 12-1 has substantially equal power (optical power) in an X-axis direction and a Y-axis direction. More specifically, in the case where an arbitrary axis orthogonal to the Z axis is defined, and a virtual plane including the axis and the Z axis is defined, for example, $P_Y = P_X$ is established where an axis included in a virtual plane capable of obtaining maximum power is an X axis, power in the X-axis direction is $P_X$, and power in the Y-axis direction is $P_Y$. In other words, in such a configuration, the liquid crystal lens array constitutes a microlens array section having an isotropic focal length on the Z axis as a center. In addition, as such a liquid crystal lens array, for example, an optical characteristic variable optical element disclosed in Japanese Unexamined Patent Application Publication No. 2006-18325 or 2006-189434 may be used, but the liquid crystal lens array is not limited thereto.

In this case, the first substrate 21 and the second substrate 25 each are configured of a transparent substrate such as a glass substrate allowing incident light to pass therethrough. Moreover, the first electrode 22 and the second electrode 24 each are configured of a transparent electrode made of, for example, ITO (Indium Tin Oxide), and as in the case of the first substrate 21 and the second substrate 25, the first electrode 22 and the second electrode 24 allow incident light to pass therethrough. As described above, a plurality of concave curved surfaces are formed in a two-dimensional matrix form on a surface $S_1$ of the electrode 22 of surfaces $S_1$ and $S_2$ of the first electrode 22 and the second electrode 24. The liquid crystal layer 23 is made of a non-polarizing/isotropic refractive index liquid crystal, for example, a nematic liquid crystal, and the refractive index of the liquid crystal layer 23 is changed by changing the alignment state of liquid crystal molecules in the liquid crystal layer 23 in response to a voltage applied between the first electrode 22 and the second electrode 24. In addition, the basic configuration and composition of such a liquid crystal lens array may be the same even in a microlens array section configured of a liquid crystal lens array in any of the second to fourth embodiments which will be described later.

Further, as in the case of the image pickup apparatus 1 of the first embodiment, when natural light including light of various wavelength ranges is used for image pickup, it is preferable that the surface $S_1$ of the second electrode 22 be an aspherical surface, thereby the microlens 12-1 becomes an aspherical lens. Compared to the case where the microlens 12-1 is configured of a spherical lens, the curvature of the microlens 12-1 configured of an aspherical lens can be smaller, thereby optical design becomes easier. Moreover, compared to the case where the microlens 12-1 is configured of a diffractive lens, wavelength dependence at the time of refracting incident light disappears, so the occurrence of axial chromatic aberration or the like can be prevented, and the microlens 12-1 can have a configuration suitable for image pickup by natural light including light of various wavelength ranges. Further, in the case of using the microlens 12-1 for imaging using monochromatic light or the like, there is no issue in wavelength dependence or axial chromatic aberration, so the microlens 12-1 configured of a diffractive lens can have superior optical characteristics, compared to the microlens 12-1 configured of an aspherical lens.

Referring to FIG. 1, FIGS. 3(A) and (B) and FIGS. 4(A) and (B), the operation of the image pickup apparatus 1 of the first embodiment will be described in detail below. FIGS. 3(A) and (B) are schematic partially sectional views for describing a lens effect of the microlens array section 12, and FIG. 3(A) illustrates the case where a voltage is not applied to the microlens array section 12 (the first image pickup mode), and FIG. 3(B) illustrates the case where a voltage is applied to the microlens section 12 (the second image pickup mode).

In the image pickup apparatus 1 of the first embodiment, in the second image pickup mode, an image of an object subjected to image pickup by the image pickup lens 11 is formed on the microlens 12-1. Then, light emitted from the microlens 12-1 reaches the image pickup device 13, and is projected on the image pickup device 13, thereby an image pickup signal is obtained from the image pickup device 13 under the control of the image pickup device driving means 16. In other words, in the second image pickup mode in which a voltage is applied from the voltage supply section 15 to the first electrode 22 and the second electrode 24, the refractive index of the liquid crystal layer 23 is changed, so as illustrated in FIG. 3(B), incident light $L_{11}$ entering into the microlens 12-1 is refracted in the microlens 12-1 to be condensed to a pixel $PL_{11}$ as a focal point on an optical axis $L_0$. Thus, when at the time of image pickup in the second image pickup mode, a voltage is applied to the microlens array section 12 so as to change the focal length of each of the microlenses 12-1 constituting the microlens array section 12 to a finite value (more specifically, to change the focal length of each of the microlenses 12-1 to a distance from an image forming plane of the microlens array section 12 to an image pickup plane of the image pickup device 13), an image by the image pickup lens 11 formed on the microlenses 12-1 can be projected (condensed, converged) on the image pickup device 13.

On the other hand, in the first image pickup mode, the focal length of each of the microlenses 12-1 constituting the microlens array section 12 is infinite, and an image of an object subjected to image pickup by the image pickup lens 11 is formed on the image pickup device 13 without influence by the microlens 12-1. Then, under the control of the image pickup device driving means 16, an image pickup signal is obtained from the image pickup device 13. In other words, in the first image pickup mode in which a voltage is not applied from the voltage supply section 15 to the first electrode 22 and the second electrode 24, the refractive index of the liquid crystal layer 23 is not changed, so as illustrated in FIG. 3(A), light entering into the microlens array section 12 is not refracted in the microlens 12-1. The focal length of the microlens array section 12 is infinite, so light travels toward the image pickup device 13 without change. Thus, when at the time of image pickup in the first image pickup mode, the application of a voltage to the microlens array section 12 is suspended so that the focal length of each of the microlenses 12-1 constituting the microlens array section 12 becomes infinite, an image by the image pickup lens 11 can be formed on the image pickup device 13.

Thus, in the normal high-resolution image pickup mode (the first image pickup mode), under the control by the control section 17, the application of a voltage to the microlens array section 12 by the voltage supply section 15 is suspended, thereby as a result, the focal length of each of the microlenses 12-1 constituting the microlens array section 12 becomes infinite, and incident light into the microlens array section 12 travels without change, and an image by the image pickup lens 11 is formed on the image pickup device 13. In other words, the image by the image pickup lens 11 reaches the image pickup device 13 without change, and normal high-resolution image pickup data is obtained. On the other hand, in the image pickup mode based on the light field photography technique (the second image pickup mode), an image by the image pickup lens 11 is formed on the microlenses 12-1. Then, under the control by the control section 17, a voltage is applied to the microlens array section 12 by the voltage supply section 15, thereby as a result, light emitted from the microlens 12-1 is condensed onto the image pickup device 13. In other words, when the focal length of each of the microlenses 12-1 constituting the microlens array section 12 is changed to a finite value, an image by the image pickup lens 11 can be projected on the image pickup device 13. More specifically, as illustrated in FIG. 3(B), the incident light $L_{11}$ (shown by solid lines) to the microlens array section 12 is projected on a point (pixel) on the image pickup device 13, and incident light $L_{12}$ (shown by dotted lines) to the microlens array section 12 is projected on a point (pixel) $PL_{12}$ on the image pickup device 13, and incident light $L_{13}$ (shown by alternate long and short dash lines) to the microlens array section 12 is projected on a point (pixel) $PL_{13}$ on the image pickup device 13. In other words, when the incident direction of incident light to the microlens array section 12 is changed, incident light is projected (condensed) on a different point (a different pixel) on the image pickup device 13.

The image pickup signal obtained by the image pickup device 13 is transmitted to the image processing section 14. Then, in the image processing section 14, under the control by the control section 17, predetermined image processing is performed on the image pickup signal to output the image pickup signal as image pickup data $D_{out}$. More specifically, in the first image pickup mode, under the control by the control section 17, the predetermined image processing by the image processing section 14 is suspended, thereby as a result, the inputted image pickup signal is outputted as it is as image pickup data $D_{out}$. On the other hand, in the second image pickup mode, under the control by the control section 17, the predetermined image processing (refocusing arithmetic processing) is performed by the image processing section 14, thereby as a result, the predetermined image processing is performed on the inputted image pickup signal, and the processed image pickup signal is outputted as image pickup data $D_{out}$.

Now, referring to FIGS. 4(A) and (B), refocusing arithmetic processing as the predetermined image processing in the image processing section 14 will be described in detail below. In addition, the refocusing arithmetic processing is applied to the second to fourth embodiments which will be described later in the same manner.

Figure 4A:
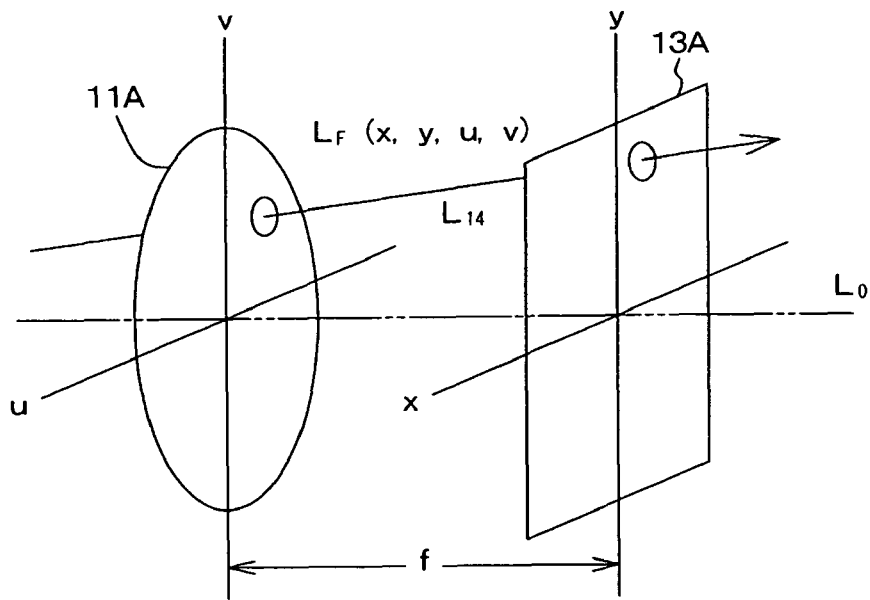
FIG. 4(A) is a conceptual diagram of an image pickup lens or the like for describing predetermined image processing in a second image pickup mode.
Figure 4B:
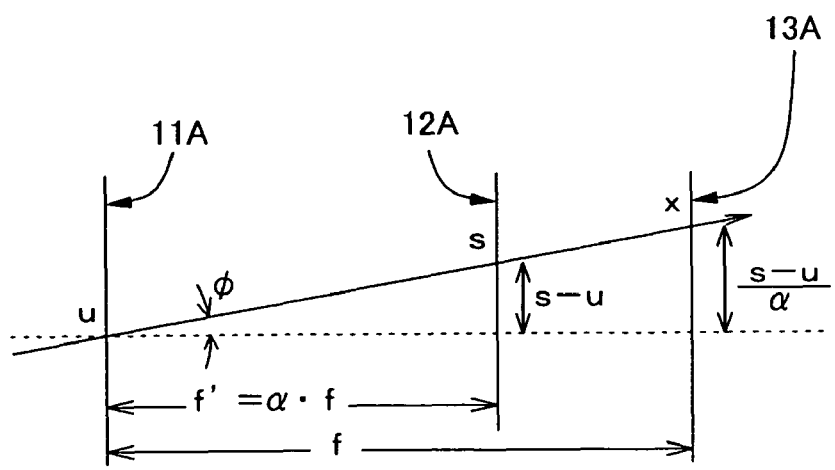
FIG. 4(B) is an illustration for describing the predetermined image processing in the second image pickup mode.

As illustrated in FIG. 4(A), a rectangular coordinate system (u, v) is defined on an image pickup lens plane 11A of the image pickup lens 11, and a rectangular coordinate system (x, y) is defined on an image pickup plane 13A of the image pickup device 13. When a distance between the image pickup lens plane of the image pickup lens 11 and the image pickup plane of the image pickup device 13 is defined as "f", a light ray $L_{14}$ passing through the image pickup lens 11 and the image pickup device 13 as illustrated in FIG. 4(A) can be represented by a four-dimensional function $L_F(x, y, u, v)$. Therefore, information on the traveling direction of the light ray $L_{14}$ as well as information on the position of the light ray $L_{14}$ can be obtained. Then, in this case, in the case where a positional relationship among the image pickup lens plane 11A, the image pickup plane 13A and a refocusing plane (an image forming plane of the microlens array section 12 where an image by the image pickup lens 11 is formed) 12A is determined as illustrated in FIG. 4(B), that is, in the case where the refocusing plane 12A is determined so as to establish f'=α·f, detection light intensity $L_{F'}(s, t, u, v)$ on the image pickup plane 13A of coordinates (s, t) on the refocus plane 12A is represented by the following formula (1). Moreover, an image $E_{F'}(s, t)$ obtained on the refocus plane 12A is a value obtained by integrating the above-described detection light intensity $L_{F'}(s, t, u, v)$ with respect to a lens aperture, so the image $E_{F'}(s, t)$ is represented by the following formula (2). Therefore, when a refocusing arithmetic operation is performed on the basis of the formula (2), an image viewed from an arbitrary viewpoint of an arbitrary direction can be reconstructed by the image pickup data $D_{out}$ based on the light field photography technique, and three-dimensional information of an image can be obtained.

$$L_{F'}(s, t, u, v) = L_{(\alpha \cdot F)}(s, t, u, v) \quad (1)$$
$$= L_F\left(u + \frac{s-u}{\alpha}, v + \frac{t-v}{\alpha}, u, v\right)$$
$$= L_F\left\{u\left(1 - \frac{1}{\alpha}\right) + \frac{s}{\alpha}, v\left(1 - \frac{1}{\alpha}\right) + \frac{t}{\alpha}, u, v\right\}$$

$$E_{F'}(s, t) = \frac{1}{F'^2} \int\int L_{F'}(s, t, u, v) du dv \quad (2)$$
$$= \frac{1}{\alpha^2 F^2} \int\int L_F\left\{u\left(1 - \frac{1}{\alpha}\right) + \frac{s}{\alpha}, v\left(1 - \frac{1}{\alpha}\right) + \frac{t}{\alpha}, u, v\right\} du dv$$

Thus, in the first embodiment, the microlens array section 12 is configured of a liquid crystal lens array, so the refractive index of the liquid crystal layer 23 is changed depending on whether or not a voltage is applied to the liquid crystal layer 23, thereby the refraction direction (the focal point position) of incident light can be changed. In other words, when a voltage is applied from the voltage supply section 15 to the microlens array section 12, incident light to the microlenses 12-1 constituting the microlens array section 12 is refracted to be projected on the image pickup device 13. On the other hand, in a state in which a voltage is not applied to the microlens array section 12, incident light is not refracted, and an image of the incident light without being refracted is formed on the image pickup device 13. Therefore, image pickup mode switching between the second image pickup mode in which the predetermined image processing is performed on an image pickup signal obtained by projecting the incident light on the image pickup device 13 and the first image pickup mode in which an image of the incident light without changing its direction is formed on the image pickup device 13 to obtain the image pickup signal becomes possible. Moreover, in the first image pickup mode and the second image pickup mode, a common image pickup optical system (the image pickup lens 11, the microlens array section 12 and the image pickup device 13) is used, so the apparatus configuration is not complicated. Further, switching between image pickup modes are electrically performed, so compared to the case where switching is mechanically performed, reliability during switching operation is improved.

Further, when each of the microlenses 12-1 is configured of an aspherical lens, compared to the case where each of the microlenses 12-1 is configured of a spherical lens, the curvature can be smaller, so optical design can be easier. Moreover, compared to the case where each of the microlenses 12-1 is configured of a diffractive lens, wavelength dependence at the time of refracting the incident light can be eliminated, and the occurrence of axial chromatic aberration or the like can be prevented. Therefore, an optimum configuration as an image pickup apparatus using natural light including light of various wavelength ranges can be obtained.

In addition, in the above-described first embodiment, in some cases, a second configuration in which the states of application of a voltage from the voltage supply section 15 to the microlens array section 12 at the time of image pickup in the first image pickup mode and at the time of image pickup in the second image pickup mode are replaced with each other can be used. That is, the image pickup apparatus further includes:

(D) the image processing section 14 for performing predetermined image processing on a signal from the image pickup device 13, and (E) the voltage supply section 15 for applying a voltage to the microlens array section 12, and the image pickup apparatus can have a configuration in which image pickup is performed in the first image pickup mode (a normal image pickup mode) and the second image pickup mode (the image pickup mode based on the light field photography technique), at the time of image pickup in the first image pickup mode, a voltage is applied from the voltage supply section 15 to the microlens array section 12, and the predetermined image processing by the image processing section 14 is suspended, and at the time of image pickup in the second image pickup mode, the application of a voltage from the voltage supply section 15 to the microlens array section 12 is suspended, and the predetermined image processing by the image processing section 14 is performed. In addition, the same hold true for the second and third embodiments which will be described later.

[Second Embodiment]

Figure 5:
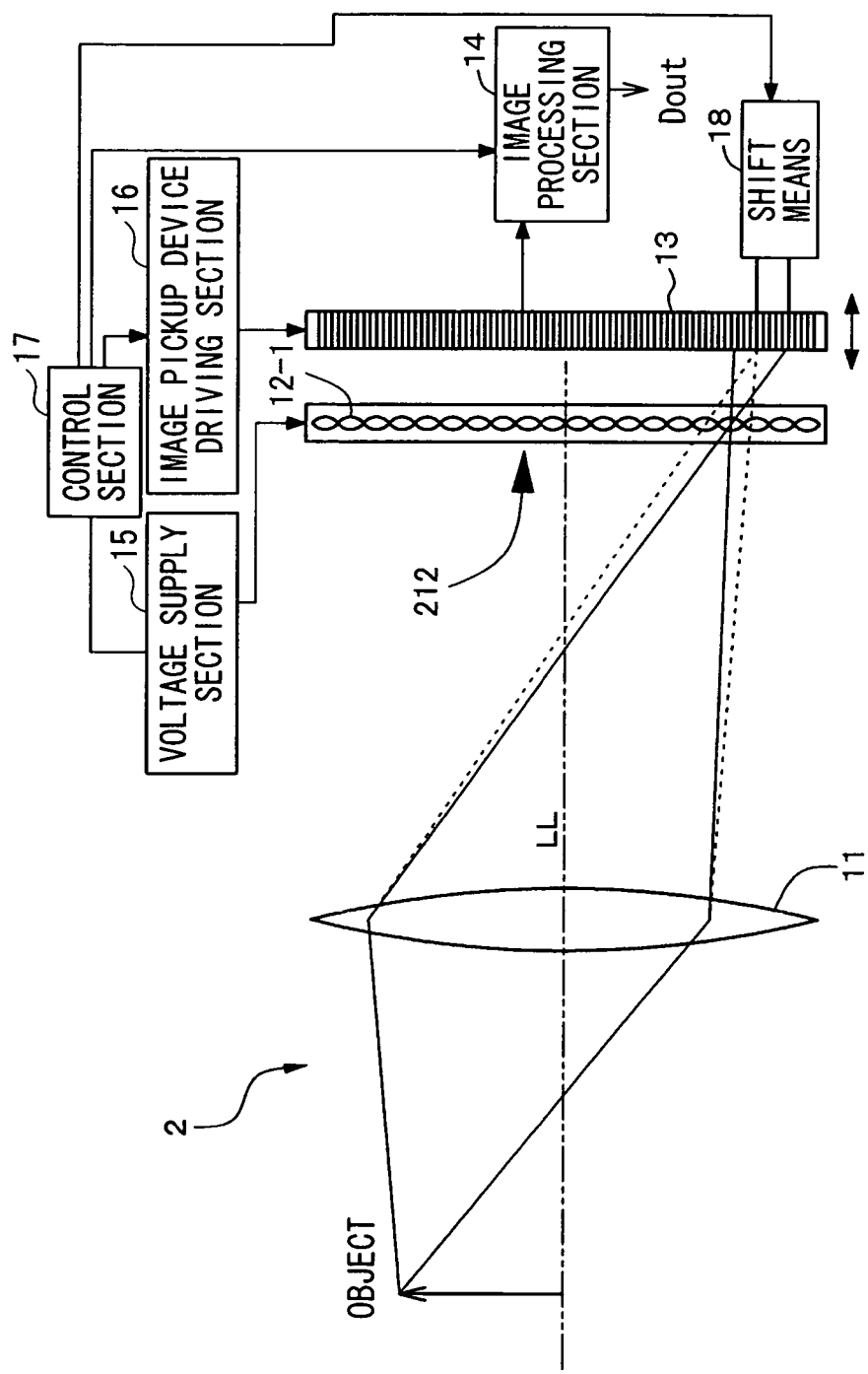
FIG. 5 is a conceptual diagram of an image pickup apparatus of a second embodiment.

The second embodiment is a modification of the first embodiment, and more specifically, the second embodiment relates to a third configuration and a 4Ath configuration. FIG. 5 illustrates a conceptual diagram of an image pickup apparatus of the second embodiment, and an image pickup apparatus 2 of the second embodiment further includes a driving means 18 changing a distance between the microlens array section 12 and the image pickup device (the image pickup means) 13 while maintaining a fixed distance between the image pickup lens 11 and the microlens array section 12. Then, in the case where a mismatch between the F-number of the image pickup lens 11 and the F-number of each of microlenses constituting the microlens array section 12 occurs, a voltage applied from the voltage supply section 15 to the microlens array section 12 is changed, and the distance between the microlens array section 12 and the image pickup device 13 is changed by the driving means 18. The driving means (corresponding to an image pickup device shift section) 18 can be configured of a device converting an electrical signal into mechanical operation, for example, a piezo device, a piezoelectric actuator or a bimetal.

Figure 6:
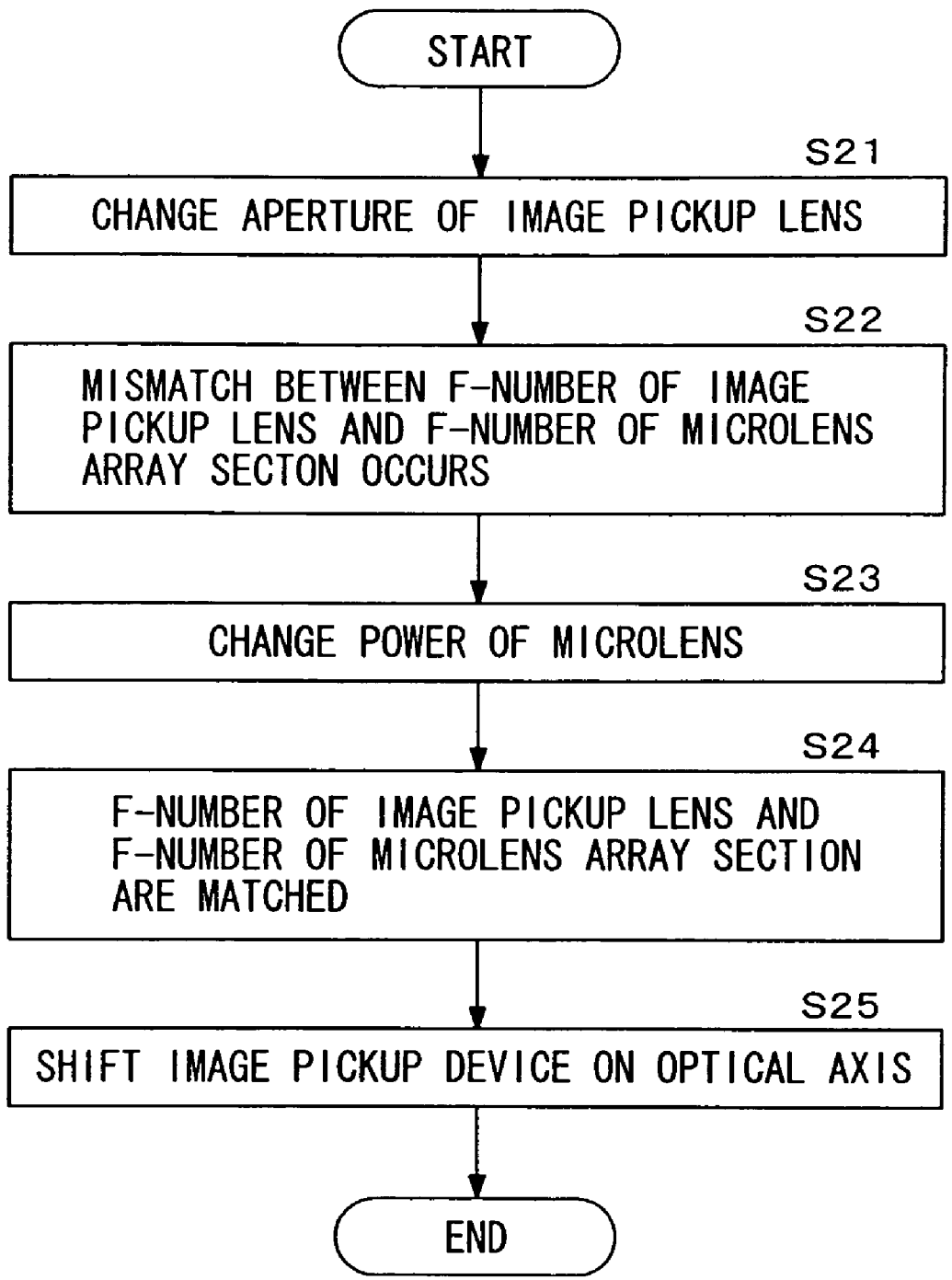
FIG. 6 is a flowchart illustrating an example of image pickup optical system optimization processing when changing the aperture of an image pickup lens.

Referring to FIGS. 5, 6 and 7(A) to (D), F-number matching processing (image pickup optical system optimization processing at the time of changing the aperture of the image pickup lens 11) as characteristic operation in the image pickup apparatus 2 of the second embodiment will be described in detail below. Now, FIG. 6 illustrates a flowchart of the image pickup optical system optimization processing when changing the aperture, and FIGS. 7(A) to (D) are schematic views of the image pickup lens 11 or the like for describing an example of an optical path in the image pickup optical system optimization processing when changing the aperture of the image pickup lens 11. In addition, the basic operation (image pickup operation) of the image pickup apparatus 2 can be the same as those in the image pickup apparatus 1 of the first embodiment, and a detailed description will not be given.

Figure 7A:
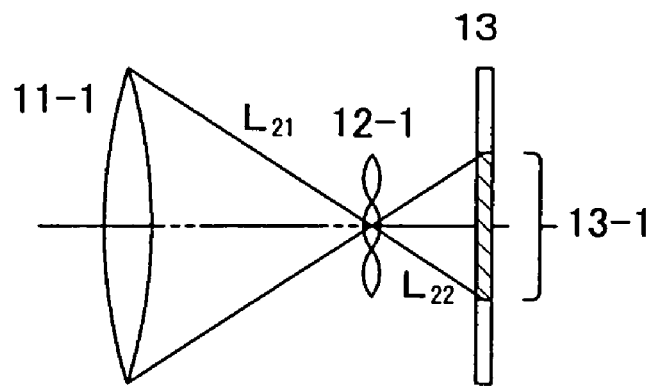
FIGS. 7(A) to (D) schematic views of the image pickup lens or the like for describing an example of an optical path in the image pickup optical system optimization processing when changing the aperture of the image pickup lens illustrated in FIG. 6.
Figure 7B:
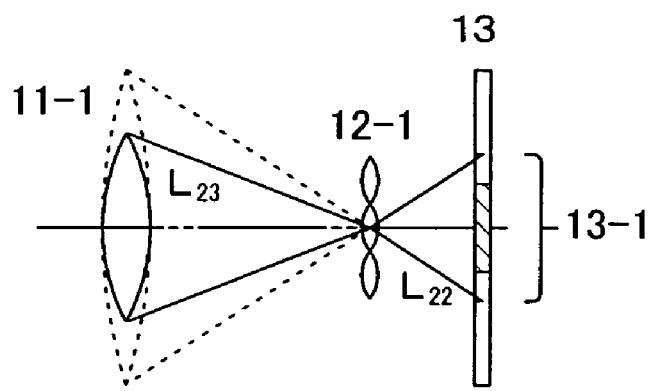

In the image pickup apparatus 2, for example, as in the case of light rays $L_{21}$ and $L_{22}$ illustrated in FIG. 7(A), the case where the F-number of the image pickup lens 11 and the F-number of each of the microlenses constituting the microlens array section 12 (hereinafter simply referred to as the F-number of the microlens) are matched is assumed first. Then, in the case where the aperture of the image pickup lens 11 is changed from a state illustrated in FIG. 7(A) (step S21 in FIG. 6), as in the case of light rays $L_{23}$ and $L_{22}$ illustrated in FIG. 7(B), a mismatch between the F-number (from an entrance pupil diameter 11-1) of the image pickup lens 11 and the F-number of the microlens occurs (step S22). In the case of an example illustrated in FIG. 7(B), a voltage applied from the voltage supply section 15 to the microlens array section 12 is changed by the control section 17 to change power generated in the microlens array section 12 (step S23).

Figure 7C:
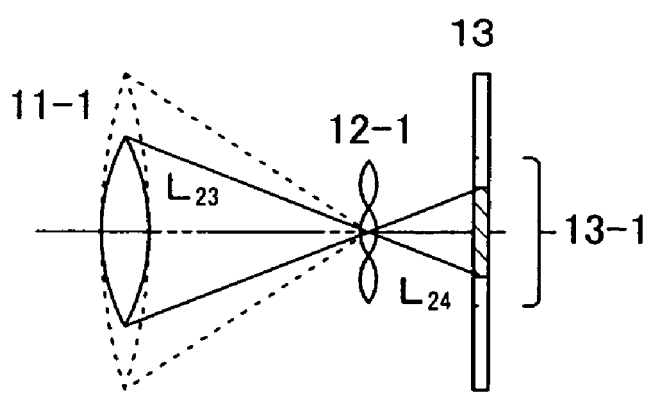

Then, as illustrated in FIG. 7(C), the refraction of light in the microlens array section 12 is reduced, and light emitted from the microlens array section 12 is changed from the light ray $L_{22}$ to a light ray $L_{24}$. Then, as indicated by the light rays $L_{23}$ and $L_{24}$, the F-number (from the entrance pupil diameter 11-1) of the image pickup lens 11 and the F-number of the microlens are matched to each other again (step S24). However, it is obvious from FIG. 7(C) that unlike the case of the light ray $L_{22}$ in FIGS. 7(A) and (B), an image pickup region 13-1 (indicated by a diagonally shaded region in FIGS. 7(A) to (D)) corresponding to one microlens in the image pickup device 13 and a region where the light ray $L_{24}$ reaches in the image pickup region 13-1 are not matched to each other, and if this state remains, resolution at the time of image pickup declines.

Therefore, next, the driving means (the image pickup device shift section) 18 is controlled by the control section 17 to shift the image pickup device 13 along an optical axis $L_0$ (an optical axis LL of the image pickup apparatus) in a direction away from the microlens array section 12 in an illustrated example (step S25). Then, as in the case of the light rays $L_{23}$ and $L_{24}$ illustrated in FIG. 7(D), the image pickup region 13-1 and the region where the light ray $L_{24}$ reaches in the image pickup region 13-1 are matched to each other again, and the image pickup region in the image pickup device 13 is optimized. Thus, the image pickup optical system optimization processing when changing the aperture of the image pickup lens 11 is completed. In the second embodiment, such processing is performed, so a decline in resolution at the time of image pickup does not occur. When the driving means 18 is configured of, for example, a device converting an electrical signal into mechanical operation, a simple and space-saving image pickup apparatus can be formed.

In addition, instead of performing a process of shifting the image pickup device 13 after performing a process of changing the power of the microlenses constituting the microlens array section 12 (step S23), the processing of changing the power of the microlenses constituting the microlens array section 12 may be performed (step S23) after performing the process of shifting the image pickup device 13 (step S25).

Figure 7D:
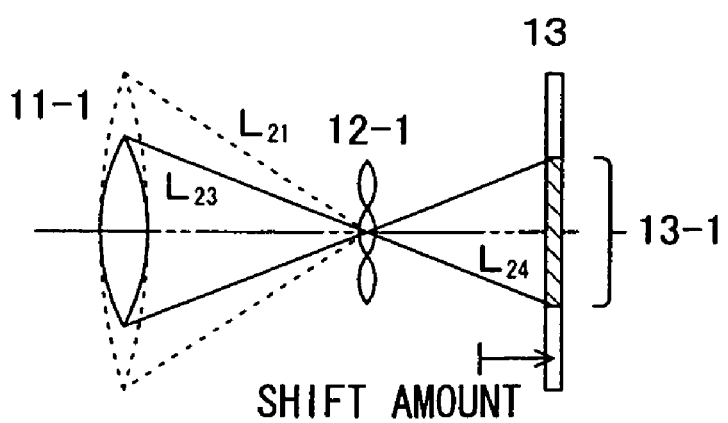

Moreover, after matching the F-numbers of the image pickup lens 11 and the microlens to each other, the driving means 18 shifts the image pickup device 13, thereby a distance between the microlens array section 12 and the image pickup device 13 is changed; however, alternatively, as illustrated in FIGS. 8(A) and (B), the image pickup apparatus can have a configuration in which instead of the operation described referring to FIG. 7(D), after the processes in the steps S21 to S24, the driving means shifts the image pickup lens 11 and the microlens array section 12 along the optical axis LL of the image pickup apparatus while maintaining a fixed distance between the image pickup lens 11 and the microlens array section 12. More specifically, the image pickup lens 11 and the microlens array section 12 are shifted along the optical axis $L_0$ of the image pickup apparatus (the optical axis LL of the image pickup apparatus) so that the size of an image on the image pickup device 13 by the light rays $L_{21}$ and $L_{22}$ is matched to the size of an image by the light rays $L_{23}$ and $L_{24}$ (so that the image pickup regions in both cases are matched to the image pickup region 13-1). As a mechanism for shifting the image pickup lens 11, a driving mechanism of the image pickup lens used for normal image pickup may be used.

The driving means 18 and F-number matching processing (image pickup optical system optimization processing when changing the aperture of the image pickup lens) described in the second embodiment are applicable to the third and fourth embodiments which will be described later.

[Third Embodiment]

Figure 9:
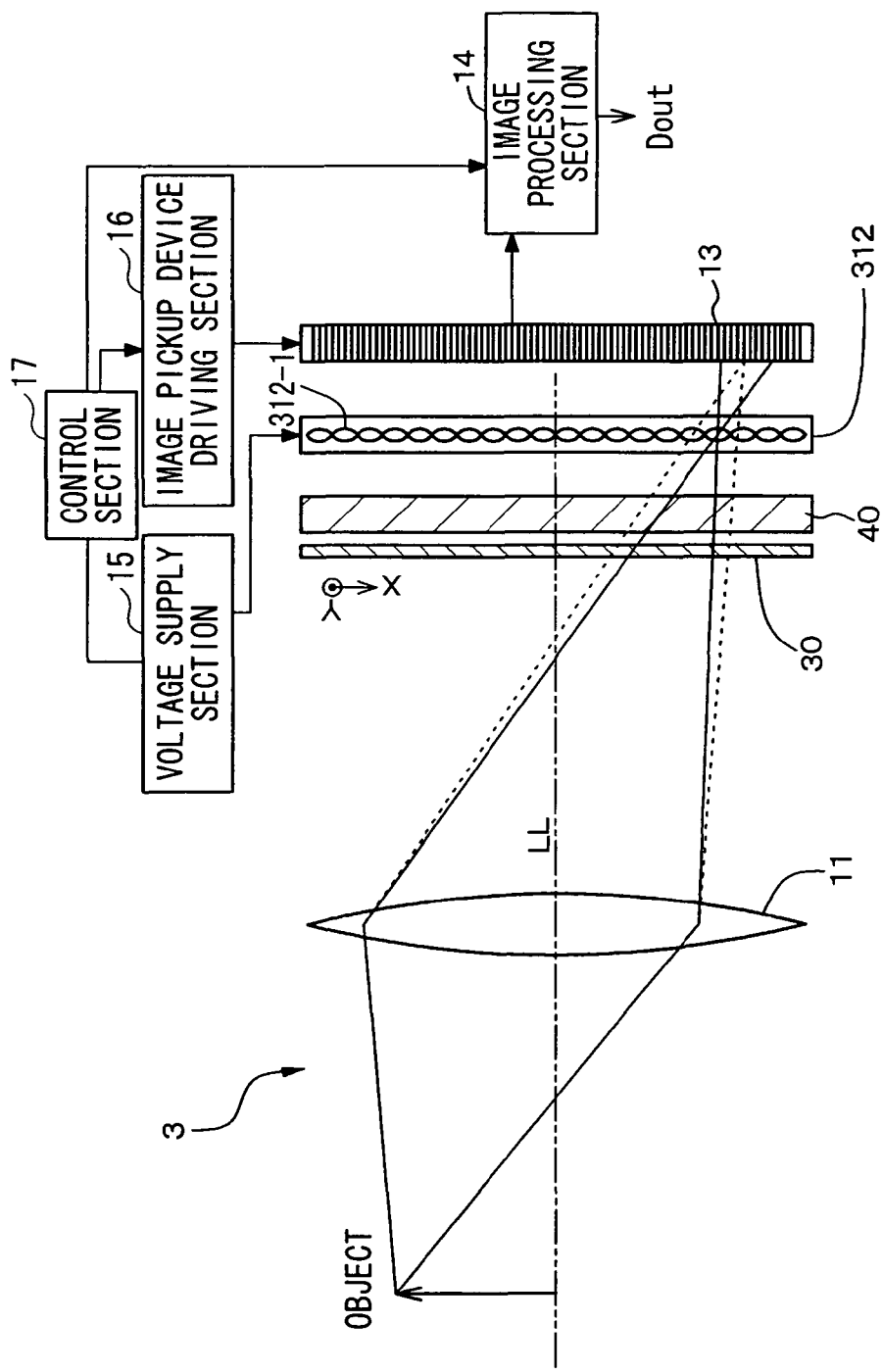
FIG. 9 is a conceptual diagram of the image pickup apparatus of the third embodiment.

The third embodiment is also a modification of the first embodiment. In the third embodiment, a 4Bth configuration is used. In other words, as illustrated in a conceptual diagram in FIG. 9, when a three-dimensional Gaussian space with an optical axis of an image pickup apparatus 3 as a Z axis is defined, a polarizing plate 30 emitting polarized light to an X-axis direction and a polarization direction variable device 40 are arranged between the image pickup lens 11 and a microlens array section 312. Then, when a liquid crystal lens array constituting the microlens array section 312 functions as a lens, each microlens does not have power (optical power) in the X-axis direction and has power (optical power) in a Y-axis direction. That is, the liquid crystal lens array constitutes the microlens array section 312 having an anisotropic focal length on the Z axis as a center. In other words, each of liquid crystal lenses constituting the liquid crystal lens array forms a microlens having a finite focal length in a YZ plane and an infinite focal length in an XZ plane.

Figure 2B:
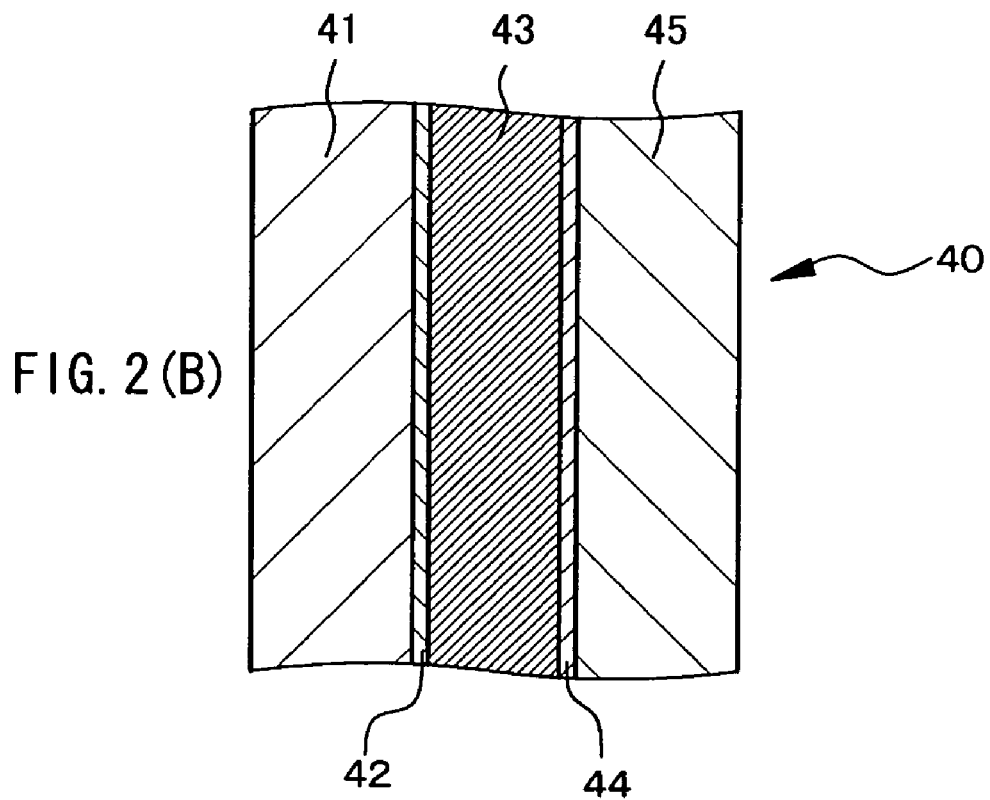
FIG. 2(B) is an enlarged schematic partially sectional view of a polarization direction variable device included in an image pickup apparatus of a third embodiment.

The polarization direction variable device 40 is configured of a liquid crystal device. More specifically, as illustrated in a schematic partially sectional view of FIG. 2(B), the polarization direction variable device 40 includes:

(a') a pair of substrates 41 and 45, (b') electrodes 42 and 44 arranged on the pair of substrates 41 and 45, respectively, (c') a liquid crystal layer 43 arranged between the electrodes 42 and 44 arranged on the pair of substrates 41 and 45, respectively.

Now, the alignment direction of liquid crystal molecules in proximity to one substrate 41 is parallel to the X-axis direction, and the alignment direction of liquid crystal molecules in proximity of the other substrate 45 is parallel to the Y-axis direction. Moreover, the electrode 42 is configured of one flat electrode, and the electrode 44 is configured of one flat electrode.

Figure 10A:
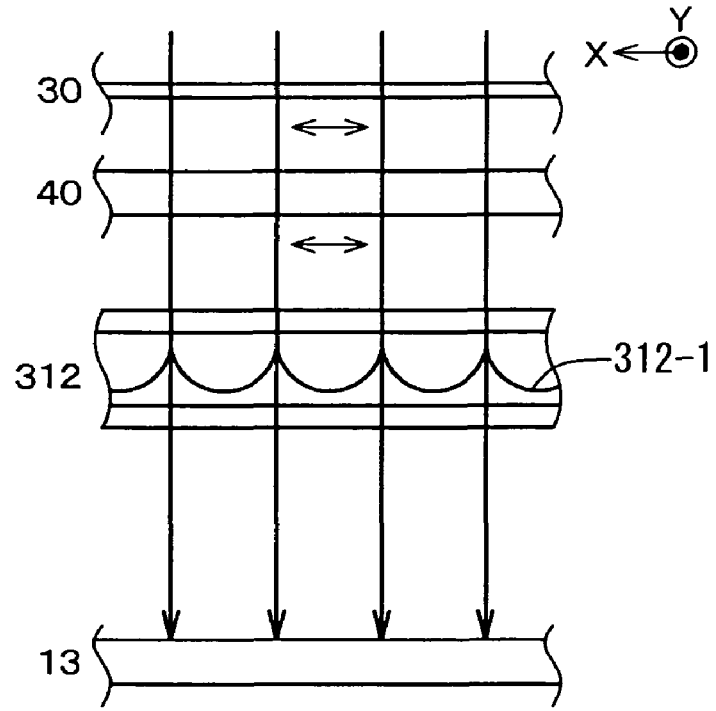
FIGS. 10(A) and (B) are illustrations schematically illustrating a state in which light passing through microlenses forms an image on the image pickup device and a state in which the light passing through the microlenses is projected on the image pickup device in the image pickup apparatus of the third embodiment.
Figure 10B:
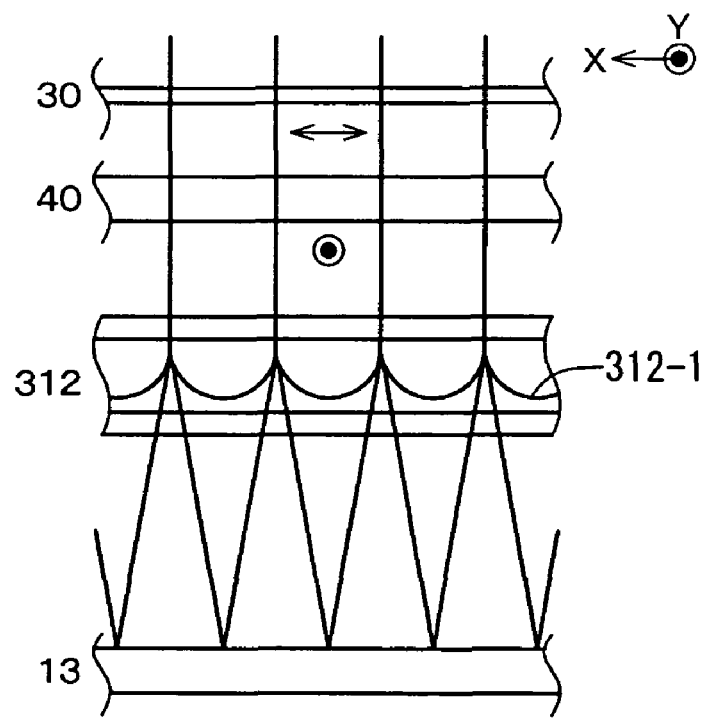

In the third embodiment, a monochromatic light source is used as a light source, but the light source is not limited thereto. Light passing through the polarizing plate 30 has only a polarization component parallel to the X axis. Then, in a first operation mode of the polarization direction variable device 40, the polarization direction of light passing through the polarization direction variable device 40 is not bent by liquid crystal molecules constituting the polarization direction variable device 40, and remains still. As each of liquid crystal lenses constituting a liquid crystal lens array as the microlens array section 312 is a microlens having an anisotropic focal length on the Z axis as a center (the focal length in the X-axis direction is infinite and the focal length in the Y-axis direction is a finite value), light passing through a microlens 312-1 (an image by the image pickup lens 11) is not changed by the microlens 312-1. Then, an image of the light passing through the microlens 312-1 (the image by the image pickup lens 11) is formed on the image pickup device (image pickup means) 13. This state is schematically illustrated in FIG. 10(A).

On the other hand, in a second operation mode of the polarization direction variable device 40, the polarization direction of light passing through the polarization direction variable device 40 is bent in the Y-axis direction by the liquid crystal molecules constituting the polarization direction variable device 40. In this case, as described above, each of the liquid crystal lenses in the liquid crystal lens array constituting the microlens array section 312 is a microlens having an anisotropic focal length on the Z axis as a center (the focal length in the X-axis direction is infinite and the focal length in the Y-axis direction is a finite value), so light (the image by the image pickup lens 11) formed on the microlens 312-1 is projected on the image pickup device 13.

Then, in the third embodiment, when the polarization direction variable device 40 is in the first operation mode, the first image pickup mode may be used, and when the polarization direction variable device 40 is in the second operation mode, the second image pickup mode may be used.

As such a liquid crystal lens array, for example, a liquid crystal lens device disclosed in Japanese Unexamined Patent Application Publication No. 2006-079669 or a focal length variable liquid crystal lens disclosed in Japanese Unexamined Patent Application Publication No. H5-034656 may be used, but the liquid crystal lens array is not limited thereto. The liquid crystal lens device or the liquid crystal lens develops a lens effect on only light in a polarization direction which is the same direction as a rubbing direction. Therefore, the rubbing directions in the pair of substrates 41 and 45 may be a direction parallel to the X-axis direction and a direction parallel to the Y-axis direction.

Figure 11:
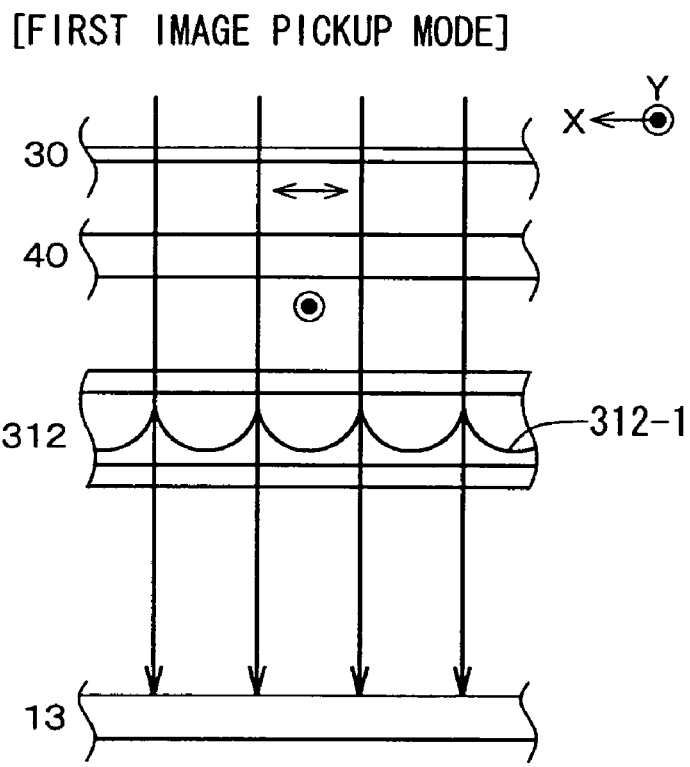
FIGS. 11(A) and (B) are illustrations schematically illustrating a modification example of the state in which light passing through the microlenses forms an image on the image pickup device and a modification example of the state in which the light passing through the microlenseses is projected on the image pickup device in the image pickup apparatus of the third embodiment.
Figure 11:
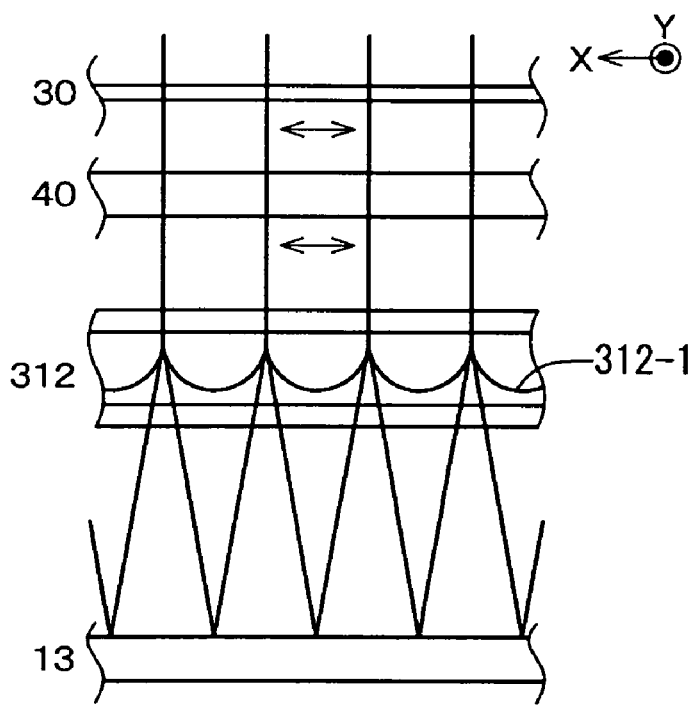

Depending on the kind of a liquid crystal material of which the used liquid crystal layer 43 is made, the second operation mode may be obtained when a voltage is applied to the electrodes 42 and 44, or the second operation mode may be obtained when the voltage is not applied to the electrodes 42 and 44. Moreover, depending on the kind of the liquid crystal material of which the liquid crystal layer 43 is made, when the liquid crystal lens array functions as a lens, the image pickup apparatus can have a configuration in which each microlens does not have power (optical power) in the Y-axis direction (this state is schematically illustrated in FIG. 11(A)) and has power (optical power) in the X-axis direction (this state is schematically illustrated in FIG. 11(B)), that is, a 4Cth configuration. In the 4Cth configuration, the liquid crystal lens array constitutes the microlens array section 312 having an anisotropic focal length on the Z axis as a center. In other words, each of liquid crystal lenses constituting the liquid crystal lens array forms a microlens having a finite focal length in the XZ plane and an infinite focal length in a YZ plane. Then, also in this case, when a voltage is applied to the electrodes 42 and 44, the second operation mode may be obtained, or when a voltage is not applied to the electrodes 42 and 44, the second operation mode may be obtained. The same hold true for the fourth embodiment which will be described later.

Like the image pickup apparatus 3 of the third embodiment, or an image pickup apparatus 4 of the fourth embodiment which will be described later, in the case where monochromatic light is used for image pickup, when the microlens is configured of a diffractive lens, an issue of wavelength dependence or axial chromatic aberration does not occur, so compared to the case where the microlens is configured of an aspherical lens, superior optical characteristics can be obtained.

[Fourth Embodiment]

Figure 12:
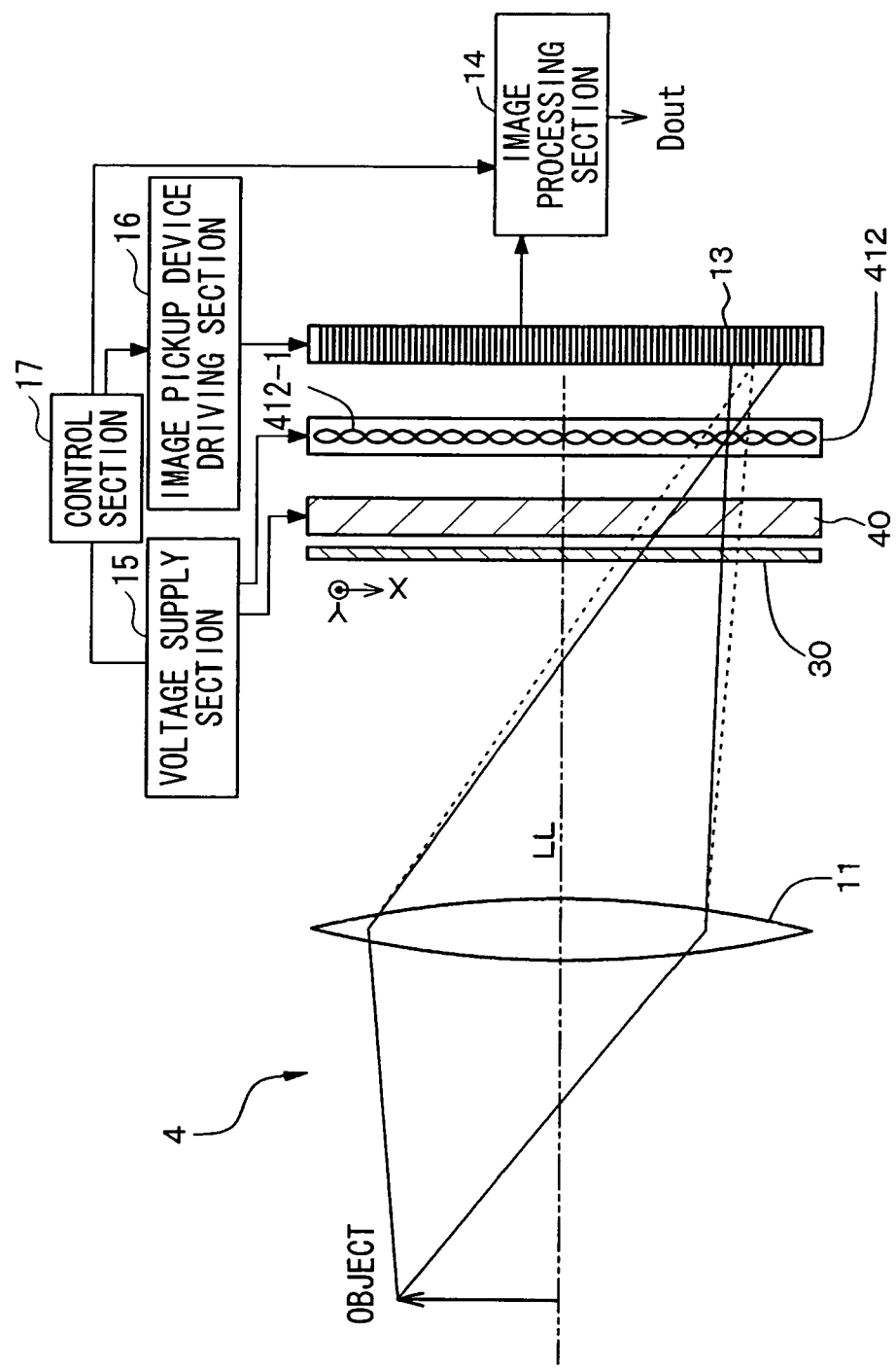
FIG. 12 is a conceptual diagram of an image pickup apparatus of a fourth embodiment.

The fourth embodiment relates to an image pickup apparatus and an image pickup method according to a second mode of the invention. FIG. 12 illustrates a conceptual diagram of the image pickup apparatus 4 of the fourth embodiment. More specifically, as in the case of the image pickup apparatus 3 of the third embodiment, the image pickup apparatus 4 of the fourth embodiment includes:

(A) the image pickup lens 11, (B) a microlens array section 412 where light passing through the image pickup lens 11 enters, and (C) the image pickup device (image pickup means) 13 sensing light emitted from the microlens array section 412, and in which when a three-dimensional Gaussian space with an optical axis of the image pickup apparatus 4 as a Z axis is defined, the polarizing plate 30 emitting light polarized in the X-axis direction and the polarization direction variable device 40 are further arranged between the image pickup lens 11 and the microlens array section 412.

Then, as in the case of the image pickup apparatus 3 of the third embodiment, the microlens array section 412 is configured of a liquid crystal lens array, and in the fourth embodiment, each of microlenses 412-1 constituting the microlens array section 412 does not have power in the X-axis direction and has power in the Y-axis direction. Also in the fourth embodiment, as a light source, a monochromatic light source is used, but the light source is not limited thereto.

In the image pickup apparatus 4 of the fourth embodiment, as in the case of the image pickup apparatus 3 of the third embodiment, image pickup is performed in the first image pickup mode and the second image pickup mode, at the time of image pickup in the first image pickup mode, by the activation of the polarization direction variable device 40, light polarized in a direction where each of the microlenses 412-1 constituting the microlens array section 412 does not have power passes through the microlenses 412-1, and an image by the image pickup lens 11 is formed on the image pickup device 13, and at the time of image pickup in the second image pickup mode, by the activation of the polarization direction variable device 40, light polarized in a direction where each of the microlenses 412-1 constituting the microlens array section 412 has power enters into the microlenses 412-1, and an image by the image pickup lens 11 is formed on the microlenses 412-1, and the image by the image pickup lens 11 formed on the microlenses 412-1 is projected on the image pickup device 13 by the microlenses 412-1.

Moreover, the image pickup apparatus 4 of the fourth embodiment further includes the image processing section 14 for performing predetermined image processing on a signal from the image pickup device 13. Then, in the image pickup apparatus 4, image pickup is performed in the first image pickup mode and the second image pickup mode, and at the time of image pickup in the first image pickup mode, the predetermined image processing by the image processing section 14 is suspended, and at the time of image pickup in the second image pickup mode, the predetermined image processing by the image processing section 14 is performed.

The polarization direction variable device 40 is configured of a liquid crystal device. More specifically, the liquid crystal device constituting the polarization direction variable device 40 can be the same as the liquid crystal device described in the third embodiment, so a detailed description will not be given. Moreover, the configurations and compositions of the image pickup lens 11, the microlens array section 412 and the image pickup device 13 constituting the image pickup apparatus 4 of the fourth embodiment can be the same as those of the image pickup lens 11, the microlens array section 312 and the image pickup device 13 constituting the image pickup apparatus 3 of the third embodiment, and a detailed description will not be given.

However, in the image pickup apparatus 4 of the fourth embodiment, switching between the first image pickup mode and the second image pickup mode is not performed depending on whether or not a voltage is applied from the voltage supply section 15 to the microlens array section 412, and as described above, switching is performed depending on whether or not a voltage is applied from the voltage supply section 15 to the electrodes 42 and 44 constituting the polarization direction variable device 40. In the microlens array section 412, depending on the liquid crystal material of which the liquid crystal layer is made, an appropriate voltage may be applied to the first electrode 22 and the second electrode 24 of the liquid crystal lens array constituting the microlens array section 412 so that each of the microlenses 412-1 constituting the microlens array section 412 can achieve a state in which each of the microlenses 412-1 does not have power in the X-axis direction and has power in the Y-axis direction. In addition, as in the case described in the third embodiment, an appropriate voltage may be applied to the first electrode 22 and the second electrode 24 of the liquid crystal lens array as the microlens array section 412 so that each of the microlenses 412-1 can achieve a state in which the microlens 412-1 does not have power in the Y-axis direction and has power in the X-axis direction. In general, a fixed voltage may be applied from the voltage supply section 15 to the microlens array section 412. Then, as in the case described in the second embodiment, in the case where F-number matching processing (image pickup optical system optimization processing when changing the aperture of the image pickup lens 11) is performed, the value of a voltage applied from the voltage supply section 15 to the microlens array section 412 may be appropriately changed.

Although the present invention is described referring to preferable embodiments, the invention is not limited thereto, and can be variously modified.

In the first to fourth embodiments, the microlens array section is a plano-convex lens in which the surface $S_1$ of the surfaces $S_1$ and $S_2$ of the electrodes 22 and 24 is a curved surface; however, alternatively, the surface $S_2$ may be a curved surface, or the microlens array section may be a biconvex lens in which both of the surfaces $S_1$ and $S_2$ are curved surfaces. In the first and second embodiments, instead of the case where the microlens array section is configured of the liquid crystal lens array, a liquid microlens array section using an electrowetting phenomenon (an electrocapillary phenomenon) may be used. Moreover, in the embodiments, as a predetermined image processing method in the image processing section 14, refocusing arithmetic processing based on the light field photography technique is described; however, the image processing method in the image processing section 14 is not limited thereto, and any other image processing method (for example, image processing in which a viewpoint is moved or image processing in which a distance obtained by functioning the microlens array section and the image pickup device as a kind of a stereo camera is calculated) may be used. Further, the shape of each of lenses constituting the microlens array section is not limited to a circular shape, and may be any of various polygonal shapes such as a rectangular shape or a hexagonal shape. When a lens with a rectangular shape or a hexagonal shape is used, light use efficiency is improved, and in a microlens array section in which lenses with a rectangular shape or a hexagonal shape are aligned densely, a flat part existing between lenses with a circular shape does not exist between the lenses with a rectangular shape or a hexagonal shape, so there is an advantage that the influence of a light ray passing through the flat part between the lenses with a circular shape can be avoided.

The invention claimed is:

1. An image pickup apparatus characterized by comprising:
    (A) an image pickup lens;
    (B) a microlens array section where light passing through the image pickup lens enters; and
    (C) an image pickup device sensing light emitted from the microlens array section,
    wherein the focal length of each of microlenses constituting the microlens array section is variable in response to an applied voltage, and
    wherein the image pickup is performed in a first image pickup mode and a second image pickup mode,
    at the time of image pickup in the first image pickup mode, the focal length of each of the microlenses constituting the microlens array section becomes infinite, thereby an image by the image pickup lens is formed on the image pickup device, and
    at the time of image pickup in the second image pickup mode, an image by the image pickup lens is formed on the microlenses, and the focal length of each of the microlenses becomes a finite value, thereby the image by the image pickup lens formed on the microlenses is projected on the image pickup device.

2. An image pickup apparatus characterized by comprising:
    (A) an image pickup lens;
    (B) a microlens array section where light passing through the image pickup lens enters;
    (C) an image pickup device sensing light emitted from the microlens array section,
    wherein the focal length of each of microlenses constituting the microlens array section is variable in response to an applied voltage;
    (D) an image processing section for performing predetermined image processing on a signal from the image pickup device; and
    (E) a voltage supply section for applying a voltage to the microlens array section,
    wherein in the image pickup apparatus, image pickup is performed in the first image pickup mode and the second image pickup mode,
    at the time of image pickup in the first image pickup mode, the application of a voltage from the voltage supply section to the microlens array section is suspended, and the predetermined image processing by the image processing section is suspended, and
    at the time of image pickup in the second image pickup mode, a voltage is applied from the voltage supply section to the microlens array section, and the predetermined image processing by the image processing section is performed.

3. An image pickup apparatus characterized by comprising:
    (A) an image pickup lens;
    (B) a microlens array section where light passing through the image pickup lens enters;
    (C) an image pickup device sensing light emitted from the microlens array section,
    wherein the focal length of each of microlenses constituting the microlens array section is variable in response to an applied voltage;
    (D) an image processing section for performing predetermined image processing on a signal from the image pickup device; and
    (E) a voltage supply section for applying a voltage to the microlens array section,
    wherein in the image pickup apparatus, image pickup is performed in the first image pickup mode and the second image pickup mode, at the time of image pickup in the first image pickup mode, a voltage is applied from the voltage supply section to the microlens array section, and the predetermined image processing by the image processing section is suspended, and at the time of image pickup in the second image pickup mode, the application of a voltage from the voltage supply section to the microlens array section is suspended, and the predetermined image processing by the image processing section is performed.

4. The image pickup apparatus according to claim 1, characterized by further comprising:

a driving means for changing a distance between the microlens array section and the image pickup device while maintaining a fixed distance between the image pickup lens and the microlens array section.

5. The image pickup apparatus according to claim 4, characterized in that the driving means shifts the image pickup device along an optical axis of the image pickup apparatus.

6. The image pickup apparatus according to claim 4, characterized in that the driving means shifts the image pickup lens and the microlens array section along an optical axis of the image pickup apparatus.

7. The image pickup apparatus according to claim 4, characterized by further comprising:

(D) an image processing section for performing predetermined image processing on a signal from the image pickup device; and (E) a voltage supply section for applying a voltage to the microlens array section, wherein in the case where a mismatch between the F-number of the image pickup lens and the F-number of each of the microlenses constituting the microlens array section occurs, a voltage applied from the voltage supply section to the microlens array section is changed, and a distance between the microlens array section and the image pickup device is changed by the driving means.

8. The image pickup apparatus according to claim 1, characterized in that the microlens array section is configured of a liquid crystal lens array.

9. The image pickup apparatus according to claim 8, characterized in that the liquid crystal lens array includes:

(a) a first substrate including a first electrode;

(b) a second substrate including a second electrode; and (c) a liquid crystal layer arranged between the first electrode and the second electrode, and depending on whether or not a voltage is applied to the first electrode and the second electrode, the liquid crystal lens array functions as a lens.

10. The image pickup apparatus according to claim 8, characterized in that when a three-dimensional Gaussian space with an optical axis of the image pickup apparatus as a Z axis is defined, and the liquid crystal lens array functions as a lens, each of the microlenses has substantially equal power in an X-axis direction and a Y-axis direction.

11. The image pickup apparatus according to claim 8, characterized in that when a three-dimensional Gaussian space with an optical axis of the image pickup apparatus as a Z axis is defined, a polarizing plate emitting light polarized in the X-axis direction and a polarization direction variable device are arranged between the image pickup lens and the microlens array section, and when the liquid crystal lens array functions as a lens, each of the microlenses does not have power in the X-axis direction and has power in the Y-axis direction.

12. The image pickup apparatus according to claim 8, characterized in that when a three-dimensional Gaussian space with an optical axis of the image pickup apparatus as a Z axis is defined, a polarizing plate emitting light polarized in the X-axis direction and a polarization direction variable device are arranged between the image pickup lens and the microlens array section, and when the liquid crystal lens array functions as a lens, each of the microlenses does not have power in the Y-axis direction and has power in the X-axis direction.

13. The image pickup apparatus according to claim 1, characterized in that each of the microlenses is an aspherical lens.

14. An image pickup method using an image pickup apparatus, the image pickup apparatus including:

(A) an image pickup lens;

(B) a microlens array section where light passing through the image pickup lens enters; and (C) an image pickup device sensing light emitted from the microlens array section, the image pickup apparatus in which the focal length of each of microlenses constituting the microlens array section is variable in response to an applied voltage, the image pickup method characterized in that image pickup is performed in a first image pickup mode and a second image pickup mode, at the time of image pickup in the first image pickup mode, the focal length of each of the microlenses constituting the microlens array section becomes infinite, thereby an image by the image pickup lens is formed on the image pickup device, and at the time of image pickup in the second image pickup mode, an image by the image pickup lens is formed on the microlenses, and the focal length of each of the microlenses becomes a finite value, thereby the image by the image pickup lens formed on the microlenses is projected on the image pickup device.

15. An image pickup apparatus characterized by comprising:

(A) an image pickup lens;

(B) a microlens array section where light passing through the image pickup lens enters; and (C) an image pickup device sensing light emitted from the microlens array section, wherein when a three-dimensional Gaussian space with an optical axis of the image pickup apparatus as a Z axis is defined, a polarizing plate emitting light polarized in an X-axis direction and a polarization direction variable device are further arranged between the image pickup lens and the microlens array section, the microlens array section is configured of a liquid crystal lens array, and each of microlenses constituting the microlens array section does not have power in the X-axis direction and has power in a Y-axis direction, or each of the microlenses does not have power in the Y-axis direction and has power in the X-axis direction.

16. An image pickup method characterized in that image pickup is performed in a first image pickup mode and a second image pickup mode, at the time of image pickup in the first image pickup mode, by the activation of a polarization direction variable device, light polarized in a direction where each of microlenses constituting a microlens array section does not have power passes through the microlenses, and an image by an image pickup lens is formed on an image pickup device, and at the time of image pickup in the second image pickup mode, by the activation of the polarization direction variable device, light polarized in a direction where each of the microlenses constituting the microlens array section has power enters into the microlenses, and an image by the image pickup lens is formed on the microlenses, and the image by the image pickup lens formed on the microlenses is projected on the image pickup device.

17. The image pickup apparatus according to claim 15, characterized by further comprising:

(D) an image processing section for performing predetermined image processing on a signal from the image pickup device, wherein in the image pickup apparatus, image pickup is performed in a first image pickup mode and a second image pickup mode, at the time of image pickup in the first image pickup mode, the predetermined image processing by the image processing section is suspended, and at the time of image pickup in the second image pickup mode, the predetermined image processing by the image processing section is performed.

18. The image pickup apparatus according to claim 15, characterized by further comprising:

a driving means for changing a distance between the microlens array section and the image pickup device while maintaining a fixed distance between the image pickup lens and the microlens array section.

19. The image pickup apparatus according to claim 18, characterized in that the driving means shifts the image pickup device along an optical axis of the image pickup apparatus.

20. The image pickup apparatus according to claim 18, characterized in that the driving means shifts the image pickup device and the microlens array section along an optical axis of the image pickup apparatus.

21. The image pickup apparatus according to claim 18, characterized by further comprising:

(D) an image processing section for performing predetermined image processing on a signal from the image pickup device, wherein in the case where a mismatch between the F-number of the image pickup lens and the F-number of each of the microlenses constituting the microlens array section occurs, the power of each of the microlenses constituting the microlens array section is changed, and a distance between the microlens array section and the image pickup device is changed by the driving means.

22. The image pickup apparatus according to claim 15, characterized in that the polarization direction variable device is configured of a liquid crystal device.

23. An image pickup method using an image pickup apparatus including:

(A) an image pickup lens;
(B) a microlens array section where light passing through the image pickup lens enters; and
(C) an image pickup device sensing light emitted from the microlens array section, the image pickup apparatus in which when a three-dimensional Gaussian space with an optical axis of the image pickup apparatus as a Z axis is defined, a polarizing plate emitting light polarized in an X-axis direction and a polarization direction variable device are further arranged between the image pickup lens and the microlens array section, the microlens array section is configured of a liquid crystal lens array, and each of microlenses constituting the microlens array section does not have power in the X-axis direction and has power in a Y-axis direction, or each of the microlenses does not have power in the Y-axis direction and has power in the X-axis direction, the image pickup method characterized in that image pickup is performed in a first image pickup mode and a second image pickup mode, at the time of image pickup in the first image pickup mode, by the activation of the polarization direction variable device, light polarized in a direction where each of the microlenses constituting the microlens array section does not have power passes through the microlenses, and an image by an image pickup lens is formed on an image pickup device, and at the time of image pickup in the second image pickup mode, by the activation of the polarization direction variable device, light polarized in a direction where each of the microlenses constituting the microlens array section has power enters into the microlenses, and an image by the image pickup lens is formed on the microlenses, and the image by the image pickup lens formed on the microlenses is projected on the image pickup device.

* * * * *